(12) United States Patent
Fuwa

(10) Patent No.: US 7,014,167 B2
(45) Date of Patent: Mar. 21, 2006

(54) CONTROL APPARATUS AND METHOD OF ELECTROMAGNETIC VALVE

(75) Inventor: Toshio Fuwa, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/093,537

(22) Filed: Mar. 11, 2002

(65) Prior Publication Data

US 2002/0158218 A1 Oct. 31, 2002

(30) Foreign Application Priority Data

Mar. 13, 2001 (JP) ......................... 2001-070752

(51) Int. Cl.
*F16K 31/02* (2006.01)

(52) U.S. Cl. ........................... 251/129.04; 251/129.16; 123/90.11

(58) Field of Classification Search ............ 251/129.04, 251/129.16; 123/90.11
See application file for complete search history.

(56) References Cited

U.S. PATENT DOCUMENTS

| | | | | |
|---|---|---|---|---|
| 3,699,989 A | * | 10/1972 | O'Connor et al. ..... | 251/129.04 |
| 5,765,514 A | * | 6/1998 | Sono et al. ............... | 123/90.11 |
| 5,797,360 A | | 8/1998 | Pischinger et al. ...... | 123/90.11 |
| 6,003,481 A | * | 12/1999 | Pischinger et al. ...... | 123/90.11 |
| 6,152,094 A | | 11/2000 | Kirschbaum ............. | 123/90.11 |
| 6,260,521 B1 | * | 7/2001 | Kirschbaum ............. | 123/90.11 |
| 6,390,039 B1 | * | 5/2002 | Fuwa ....................... | 123/90.11 |
| 6,427,971 B1 | * | 8/2002 | Kawabe et al. ......... | 251/129.04 |
| 6,474,276 B1 | * | 11/2002 | Schmitz et al. .......... | 123/90.11 |
| 6,546,903 B1 | * | 4/2003 | Taniguchi et al. ....... | 123/90.11 |
| 6,554,248 B1 | * | 4/2003 | Taniguchi et al. ...... | 251/129.04 |

FOREIGN PATENT DOCUMENTS

| | | |
|---|---|---|
| DE | 197 39 840 | 3/1999 |
| DE | 199 02 664 | 8/2000 |
| EP | 1 167 725 | 1/2002 |
| JP | A2000-130198 | 5/2000 |

* cited by examiner

*Primary Examiner*—John Bastianelli
(74) *Attorney, Agent, or Firm*—Kenyon & Kenyon

(57) ABSTRACT

A control apparatus of electromagnetic valve includes a valve body functioning as an intake valve or an exhaust valve of an internal combustion engine and an electromagnet for affecting an electromagnetic force relative to an armature provided on the valve body for actuating the valve body. A controler determines a target value regarding a force affecting the valve body when displacing the valve body from one displacement end to the other displacement end or a state quantity of the valve body varied in accordance with the force and controls the electromagnetic force of the electromagnet for attracting the armature to the one displacement side based on a deviation between the force or the state quantity and the target value so that the force or the state quantity conforms to the determined target value when displacing the valve body from the one displacement end to the other displacement end.

19 Claims, 12 Drawing Sheets

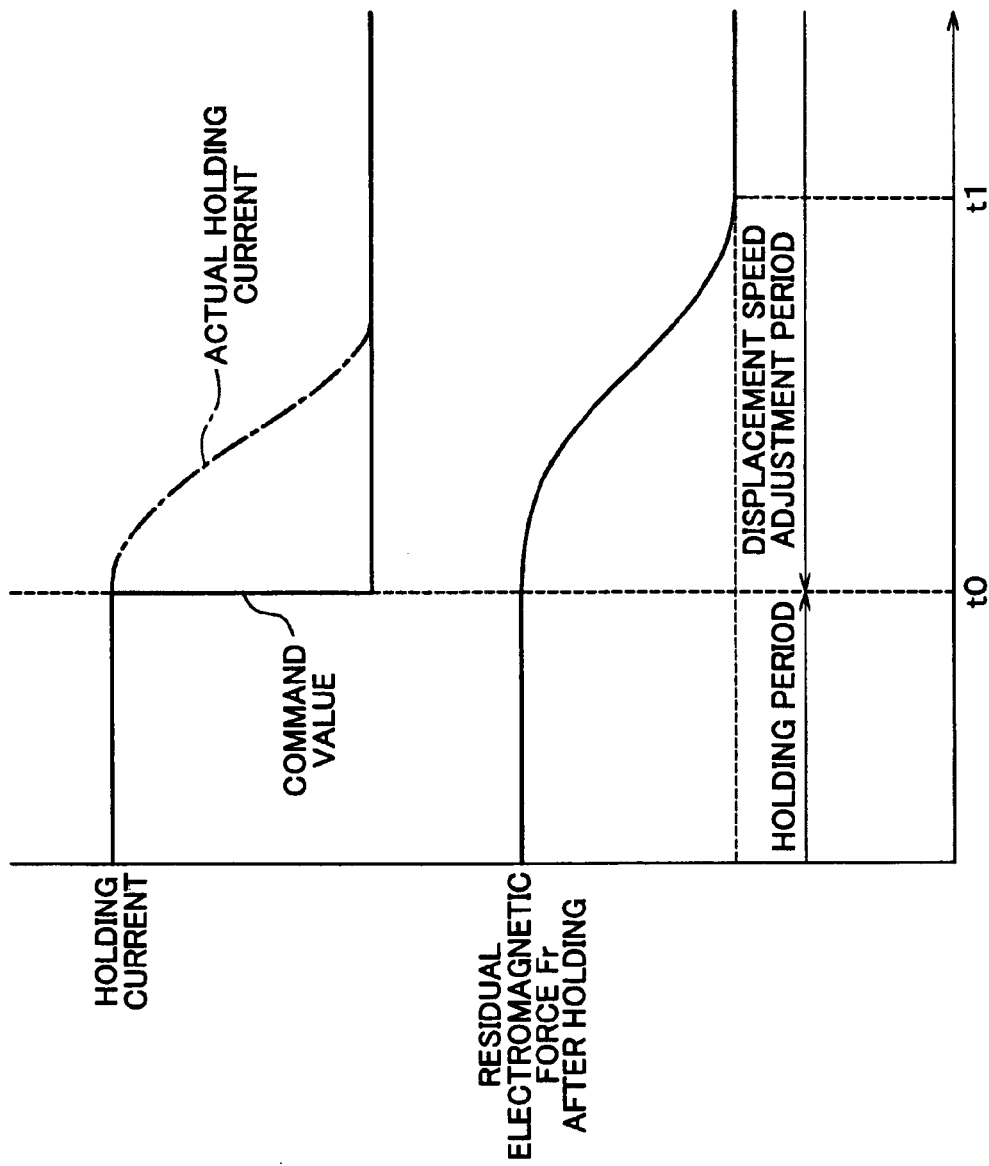

CONTROL APPARATUS AND METHOD OF ELECTROMAGNETIC VALVE

INCORPORATION BY REFERENCE

The disclosure of Japanese Patent Application No. 2001-070752 filed on Mar. 13, 2001, including the specification, drawings and abstract is incorporated herein by reference in its entirety.

BACKGROUND OF THE INVENTION

1. Filed of the Invention

This invention generally relates to a control apparatus and method for operating an electromagnetic valve. More particularly, the present invention pertains to a control apparatus and method for opening and closing an electromagnetic valve body functioning as an intake valve and exhaust valve of internal combustion based on an electromagnetic force of an electromagnet.

2. Description of Related Art

Known control apparatuses of electromagnetic valve for controlling valve bodies functioning as intake valves and exhaust valves of internal combustions based on the electromagnetic force of electromagnet have been disclosed. In the known control apparatuses of electromagnetic valves, because the external force based on the internal pressure of a combustion chamber (i.e., cylinder pressure) and the intake or exhaust pressure affect the valve body in addition to the electromagnetic force of the electromagnet, it is required to consider the influence of the external force when actuating the valve body. For example, when opening the valve body and when the large vacuum pressure is generated in the combustion chamber, the valve body is attracted in the direction for opening the valve by the vacuum. Accordingly, the displacement speed of the valve body may become unnecessarily large when reaching the fully open position. In this case, the valve body which is once reached the fully open position may rebound to the closing side, which reduces the operational stability. In addition, the valve body may be attracted in the direction for closing the valve due to the external force based on the cylinder pressure and the intake and exhaust pressure when closing the valve body. In this case, the operational stability is also reduced due to the rebound of the valve body.

A known device disclosed in a Japanese Patent Laid-Open Publication No. 2000-130198 generates the electromagnetic force for attracting the valve body towards the valve closing side when it is assumed that the vacuum pressure generated in the combustion chamber increases, such as when fuel injection is halted, so that the electromagnetic force counterbalances the external force for attracting the valve body in the direction for opening the valve.

Meanwhile, the external force affecting the valve body is not constant but is varied in accordance with the condition of the cylinder pressure and the intake and exhaust pressure, that is, in accordance with the engine operation. Accordingly, in the foregoing known device, the period for generating the electromagnetic force for attracting the valve body in the direction of closing the valve is predetermined in accordance with the engine operation in order to generate the electromagnetic force appropriate for the engine operation condition in the electromagnet.

However, in order to generate the electromagnetic force appropriate for the engine operation condition in the electromagnet, it is required to devise a countermeasure such as predetermining the aforementioned period for generating the electromagnetic force commensurate with the engine operation condition. That is, it is required to obtain the relationship between the engine operation condition and the appropriate electromagnetic force in advance through experiments and to memorize the results as a control map. This approach requires a long time for establishing and adjusting the necessary control constants.

Accordingly, the present invention is provided considering the aforementioned drawbacks. The present invention provides a control apparatus and method for an electromagnetic valve for actuating the valve body with appropriate electromagnetic force in accordance with the engine operation and for simplifying the determination of control constants used for the electromagnetic valve control.

SUMMARY OF THE INVENTION

In light of the foregoing, the present invention provides a control apparatus of electromagnetic valve which includes a valve body functioning as an intake valve or an exhaust valve of an engine combustion and an electromagnet affecting an electromagnetic force to an armature provided on the valve body for displacing the valve body between a first position and a second position based on the electromagnetic force of the electromagnet. The control apparatus of electromagnetic valve further includes a controller for determining a force affecting the valve body when displacing the valve body from the first position to the second position and a state quantity of the valve body varying in accordance with the force affecting the valve body and for controlling the electromagnetic force of the electromagnet for attracting the armature toward the first position based on a deviation between one of the determined force and the target value of the force, and the determined state quantity and the target value of the state quantity, so that the deviation is minimized, when the valve body is displaced from the first position to the second position.

According to another aspect of the present invention, a method for controlling a control apparatus of electromagnetic valve having a valve body functioning as an intake valve or an exhaust valve of an engine combustion and an electromagnet affecting an electromagnetic force to an armature provided on the valve body for displacing the valve body between a first position and a second position. According to this control method, the target value regarding a force affecting the valve body when displacing the first position to the second position or a state quantity of the valve body varied in accordance with the force is determined. Further, the electromagnetic force of the electromagnet for attracting the armature to the first position is controlled based on a deviation between one of the determined force and the target value of the force and the determined state quantity and the target value of the state quantity, so that the deviation is minimized, when displacing the valve body from the first position to the second position.

According to the aforementioned control device of the electromagnetic valve and the control method thereof, when the force affecting the valve body or the state quantity of the valve body varied in accordance with the force deviates from the target value as a result of an external force affecting the valve body resulting from the cylinder pressure when displacing the valve body from the first position to the second position, the electromagnetic force of the electromagnet for attracting the armature to the first position is controlled in accordance with the deviation so that the deviation is minimized. Accordingly, even when the external force affecting the valve body based on the cylinder pressure and the intake and exhaust pressure is varied in accordance with the engine operation, the electromagnetic force of the electromagnet can be appropriately corrected each time in accordance with the external force, and thus the decline of the operational stability due to the bouncing of the valve body can be reduced. Further, since the electromagnetic force of the electromagnet is controlled based on the aforementioned deviation and the electromagnetic force is corrected to be appropriate for the engine operation condition each time, it is no longer required to obtain the relationship between the engine operation condition and the corresponding appropriate electromagnetic force in advance. Thus, the determination of the control constants can be simplified.

BRIEF DESCRIPTION OF THE DRAWINGS

The above mentioned objects, features, advantages, technical and industrial significance of the invention will be better understood by reading the following detailed description of the preferred embodiments of the invention, when considered in connection with the accompanying drawings, in which:

FIG. 13 is a timing chart for explaining a sixth embodiment and for showing a holding current and a residual magnetic force after holding versus time when shifting from a holding period to a displacement speed adjusting period.

DESCRIPTION OF THE PREFERRED EMBODIMENTS

In the following description, the present invention will be described in more detail in terms of preferred embodiments.
First Embodiment:

A first embodiment of a control apparatus of electromagnetic valve according to the present invention for opening and closing an intake valve and an exhaust valve of an internal combustion engine (hereinafter referred to simply as engine) will be explained as follows.

According to the first embodiment, the intake valve and the exhaust valve are structured as electromagnetic valve actuated (i.e., opened and closed) based on the electromagnetic force of an electromagnet. Since the structure and the driving control method of the intake and exhaust valves are the same, the structure and the driving control method of the control apparatus of the electromagnetic valve will be explained regarding the exhaust valve.

Figure 1:
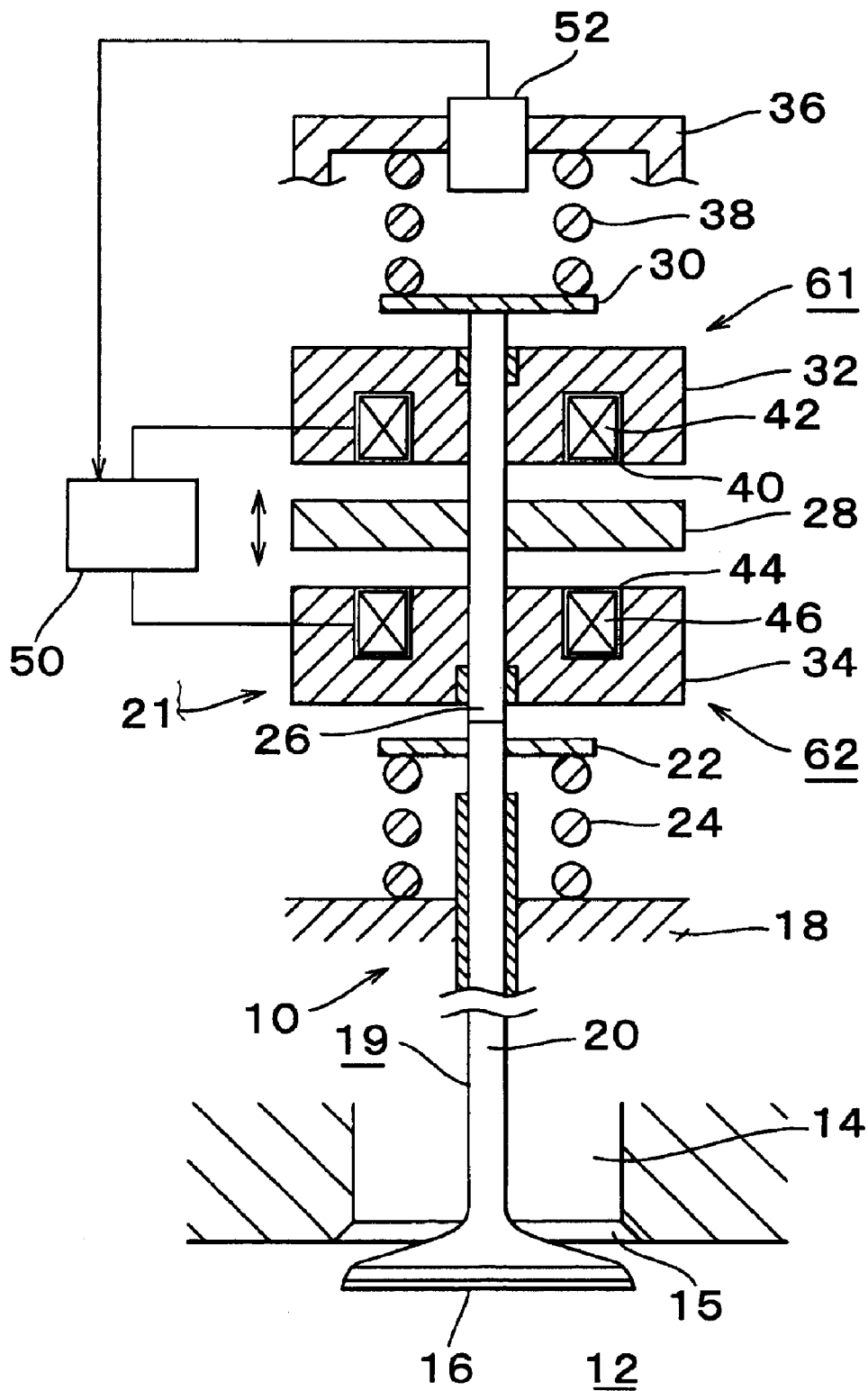
FIG. 1 is a cross-sectional overview of a control apparatus of electromagnetic valve of each embodiment according to the present invention applied to an exhaust valve of an internal combustion engine.

As shown in FIG. 1, an exhaust valve 10 includes a valve body 19 an electromagnetic driving portion 21 for reciprocating the valve body 19. The valve body 19 includes a valve shaft 20 for reciprocating an armature shaft 26 disposed coaxially with the valve shaft 20 and reciprocating along with the valve shaft 20, and an umbrella portion 16 provided on one end of the valve shaft 20. Valve shaft 20 is supported by a cylinder head 18.

The cylinder head 18 is formed with an exhaust port 14 in communication with a combustion chamber 12. A valve seat 15 is formed on an opening periphery of the exhaust port 14. The exhaust port 14 is opened and closed by the umbrella portion 16 seating on and leaving from the valve seat 15 in accordance with the reciprocating motion of the valve shaft 20.

A lower retainer 22 is fixed on the other end of the valve shaft 20 opposite to the end portion provided with the umbrella portion 16. A lower spring 24 is compressively disposed between the lower retainer 22 and the cylinder head 18. The valve body 19 is biased in the direction for closing valve (i.e., upward direction of FIG. 1) by the elastic force of the lower spring 24.

A disc shaped armature 28 made of high permeability material is fixed to approximately a central portion in axial direction of the armature shaft 26. An upper retainer 30 is fixed on one end of the armature shaft 26. The other end portion of the armature shaft 26 opposite to the end portion fixed to the upper retainer 30 contacts an end portion on the lower retainer 22 side of the valve shaft 20.

In a casing (not shown) of the electromagnetic driving portion 21, an upper core 32 is fixedly positioned between the upper retainer 30 and the armature 28. A lower core 34 is fixedly positioned between the armature 28 and the lower retainer 22 in the casing. The upper core 32 and the lower core 34 made of high permeability material are annularly formed and the armature shaft 26 is inserted into the central portion thereof for reciprocation.

An upper spring 38 is compressively disposed between an upper cap 36 and the upper retainer 30 provided in the casing. The valve body 19 is biased in the direction for opening the valve (i.e., downward direction of FIG. 1) by the elastic force of the upper spring 38.

A displacement amount sensor 52 is equipped on the upper cap 36. The displacement amount sensor 52 outputs a voltage signal variable in accordance with the distance between the displacement amount sensor 52 and the upper retainer 30. Accordingly, the displacement amount of the armature shaft 26 and the valve shaft 20, that is, the displacement amount of the valve body 19, is detected based on the voltage signal.

An annular groove 40 having an axial center of the armature shaft 26 as the center is formed on a surface of the upper core 32 opposing to the armature 28. An annular upper coil 42 is disposed in the annular groove 40. A first electromagnet (i.e., electromagnet for closing actuation) 61 for closing the valve body 19 includes the upper coil 42 and the upper core 32.

An annular groove 44 having the axial center of the armature shaft 26 as the center is formed on a surface of the lower core 34 opposing to the armature 28. An annular lower coil 46 is disposed in the annular groove 44. A second electromagnet (i.e., electromagnet for opening actuation) 62 for opening the valve 19 includes the lower coil 46 and the lower core 34.

The energization of the upper coil 42 and the lower coil 46 of the first and the second electromagnets 61, 62 are controlled by an electronic control unit (ECU) 50 for performing a total control of the engine. The ECU 50 is structured with a CPU, a memory, an actuation circuit for supplying the exciting electric current to the upper coil 42 and the lower coil 46 of the first and the second electromagnets 61, 62, an input circuit for receiving the detection signal of the displacement amount sensor 52, and an analogue to digital converter (i.e., A/D converter) (all of which are not shown) for performing the analogue to digital conversion.

In the condition shown in FIG. 1, the driving current is not supplied to the first and the second electromagnets 61, 62. FIG. 1 shows the condition of the valve body 19 in which the electromagnetic force is not generated in the first and the second electromagnets 61, 62. In this condition, the armature 28 is not attracted by the electromagnetic force of the first and the second electromagnets 61, 62 and is stationary in an intermediate position between the upper core 32 and the lower core 34 where the biasing force of the lower and upper springs 24, 38 are balanced. In this case, the umbrella portion 16 is separated from the valve seat 15 and the exhaust valve 10 is ajar. The position of the valve body 19 in the foregoing condition is determined as a neutral position.

The operation of the exhaust valve 10 actuated by the energization control for the first and the second electromagnets 61, 62 will be explained as follows.

Figure 2:
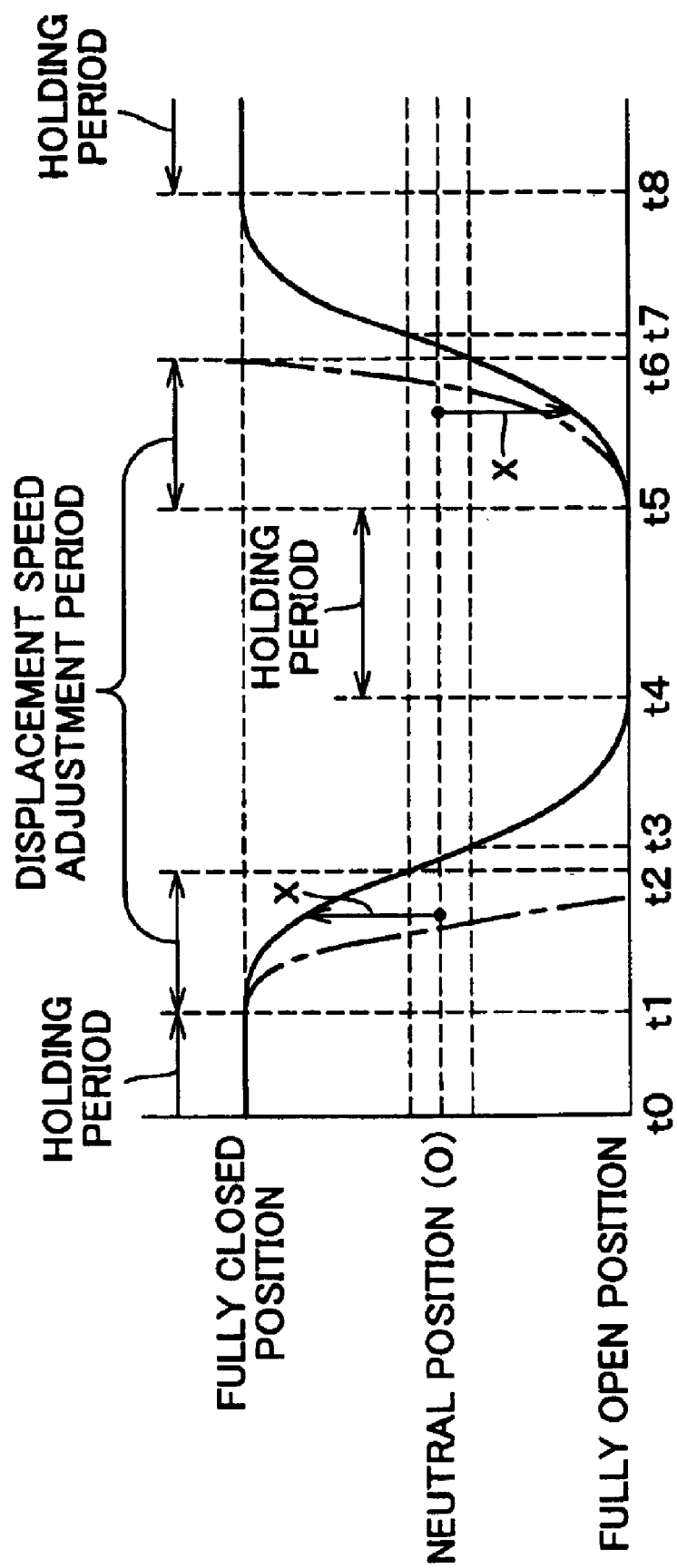
FIG. 2 is a timing chart showing a displacement amount of a valve body of the electromagnetic valve versus time.

FIG. 2 is a timing chart showing the displacement amount of the valve body 19 versus time when the exhaust valve 10 is transited from the fully open condition to the fully closed condition by closing actuation after transiting the exhaust valve 10 from the condition holding fully closed condition to fully open condition by opening actuation.

As shown in FIG. 2, a holding current for maintaining the fully closed condition of the exhaust valve 10 is supplied to the first electromagnet 61 for closing actuation during the period from a timing t0 to a timing t1. By supplying the holding current, the armature 28 is attracted by the electromagnetic force of the first electromagnet 61 to contact the upper core 32 against the elastic force of the upper spring 38 and the condition that the umbrella portion 16 is seated on the valve seat 15 is maintained.

The energization control for the first electromagnet 61 is started at an opening actuation time (i.e., timing t1) of the exhaust valve 10 to be performed during a period (i.e., timing t1–t2) in which the valve body 19 reaches the position located on the closing side by a predetermined amount relative to the neutral position. During this period, the armature 28 is separated from the upper core 32 to displace the valve body 19 in the direction for opening the exhaust valve 10. In addition, the electromagnetic force for attracting the valve body 19 (armature 28) in the direction for closing the valve is controlled by adjusting the driving current for the first electromagnet 61 so that the displacement speed for opening the valve is not to be excessively high by the external force based on the cylinder pressure and the exhaust pressure.

When the valve body 19 is displaced by a predetermined amount from the fully closed position (i.e., timing t2), the supply of the driving current for the first and the second electromagnets 61, 62 is suspended until the valve body 19 reaches the position on the valve opening side by a predetermined amount relative to the neutral position (i.e., timing t2–t3).

The valve body 19 is further displaced by the elastic force of the upper spring 38. When the valve body 19 reaches the position located on the valve opening side by a predetermined amount relative to the neutral position (i.e., timing t3), the energization control for the second electromagnet 62 is performed until the valve body 19 reaches the fully open position (i.e., timing t3–t4). During this period, the electromagnetic force for attracting the valve body 19 in the direction for opening the valve is controlled by adjusting the driving current for the second electromagnet 62 so that the valve body 19 securely reaches the fully open position with a predetermined displacement speed.

When the valve body 19 reaches the fully open position (i.e. timing t4), the holding current for maintaining the fully open condition of the exhaust valve 10 is supplied to the second electromagnet 62 until a predetermined period passes (i.e., timing t4–t5). By supplying with the holding current, the armature 28 is attracted by the electromagnetic force of the second electromagnet 62 to contact the lower core 34 against the elastic force of the lower spring 24 and the condition that the umbrella portion 16 is maintained at the position far most separated from the valve seat 15 is maintained.

When the predetermined period has elapsed after the valve body 19 reaches the fully open position, the energization control for the second electromagnet 62 is performed during the period until the valve body 19 reaches a position on valve opening side by a predetermined amount relative to the neutral position (i.e., timing t5–t6). During this period, the armature 28 is separated from the lower core 34 to displace the valve body 19 in the direction for closing the valve and the electromagnetic force for attracting the valve body 19 in the direction for opening the valve is controlled by adjusting the driving current for the second electromagnet 62 so that the displacement speed of the valve body 19 is not to be excessively high by the external force based on the cylinder pressure and the exhaust pressure.

When the valve body 19 is displaced by a predetermined amount from the fully open position (i.e., timing t6), the supply of the driving current for the first and the second electromagnets 61, 62 is suspended until the valve body 19 reaches a position on valve closing side by predetermined amount relative to the neutral position (i.e., timing t6–t7).

Then, the valve body 19 is further displaced by the elastic force of the lower spring 24. When the valve body 19 reaches a position on valve closing side by a predetermined amount relative to the neutral position (i.e., timing t7), the energization control for the first electromagnet 61 is performed until the valve body 19 reaches the fully closed position (i.e., timing t7–t8). During this period, the electromagnetic force for attracting the valve body 19 in the direction for opening the valve is controlled by adjusting the driving current for the first electromagnet 61 so that the valve body 19 securely reaches the fully closed position with a predetermined displacement speed.

When the valve body 19 reaches the fully closed position (i.e., timing 8), the holding current for maintaining the exhaust valve 10 at fully closed condition is re-supplied to the first electromagnet 61 until the next opening actuation period (i.e., after timing t8).

Thus, in the first embodiment of the control apparatus of the electromagnetic valve according to the present invention, the electromagnetic force of the first electromagnet 61 for attracting the valve body 19 in the direction for closing the valve is controlled so that the valve body 19 is not displaced in the valve opening direction with the excessively high speed as shown with a dashed line of FIG. 2 when opening the valve body 19.

Likewise, the electromagnetic force of the second electromagnet 62 for attracting the valve body 19 in the direction for opening valve is controlled so that the valve body 19 is not displaced in the closing direction with the excessively high speed when closing the valve body 19. By controlling the electromagnetic force of the first and the second electromagnets 61, 62 in the foregoing manner, the electromagnetic force of the first and the second electromagnets 61, 62 is corrected each time to meet the external force even when the external force affecting the valve body 19 based on the cylinder pressure and the exhaust pressure is varied in accordance with the engine operation, and thus the reduction of the operational stability due to the bouncing at open-close operation of the electromagnetic valve is restricted.

The period from the start of the opening actuation of the exhaust valve 10 until reaching of the valve body 19 to the position on the valve closing side by predetermined amount relative to the neutral position (i.e., timing t1–t2 of FIG. 2) and the period from the start of the closing actuation of the exhaust valve 10 until reaching of the valve body 19 to the position on the valve opening side by predetermined amount relative to the neutral position (i.e., timing t5–t6 of FIG. 2) are called displacement speed adjustment periods. The period after the valve body 19 reaches the fully closed position until the opening actuation is started (i.e., timing t0–t1 and after timing t8 of FIG. 2) and the period after the valve body 19 reaches the fully open position until the closing actuation is started (i.e., timing t4–t5 of FIG. 2) are called holding periods.

The energization control of the first and the second electromagnets 61, 62 during the displacement speed adjustment period will be explained regarding the case for opening the valve body 19 of the exhaust valve 10 at the fully closed position referring to FIGS. 3–4.

Figure 3:
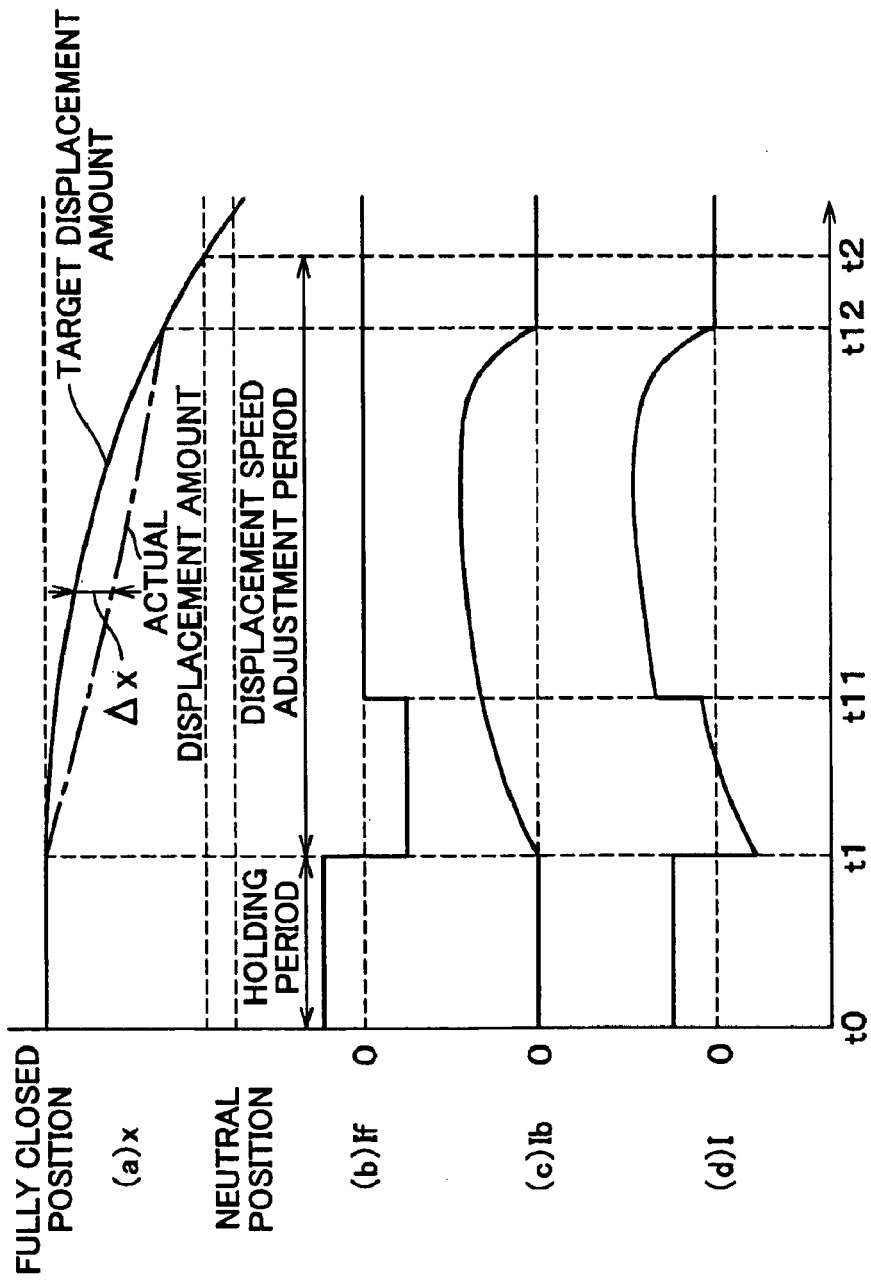
FIG. 3 is a timing chart showing a displacement amount, a feed forward electric current, a feedback electric current, and a driving electric current of the electromagnetic valve versus time.

In FIG. 3, timing charts (a)–(d) show the time shift of the displacement amount of the valve body 19, a feed forward electric current (i.e., FF current) If supplied to the first electromagnet 61, a feedback electric current (FB current) Ib supplied to the first electromagnet 61, and the sum of the FF current If and the FB current Ib (hereinafter referred as driving current I) respectively.

Figure 4:
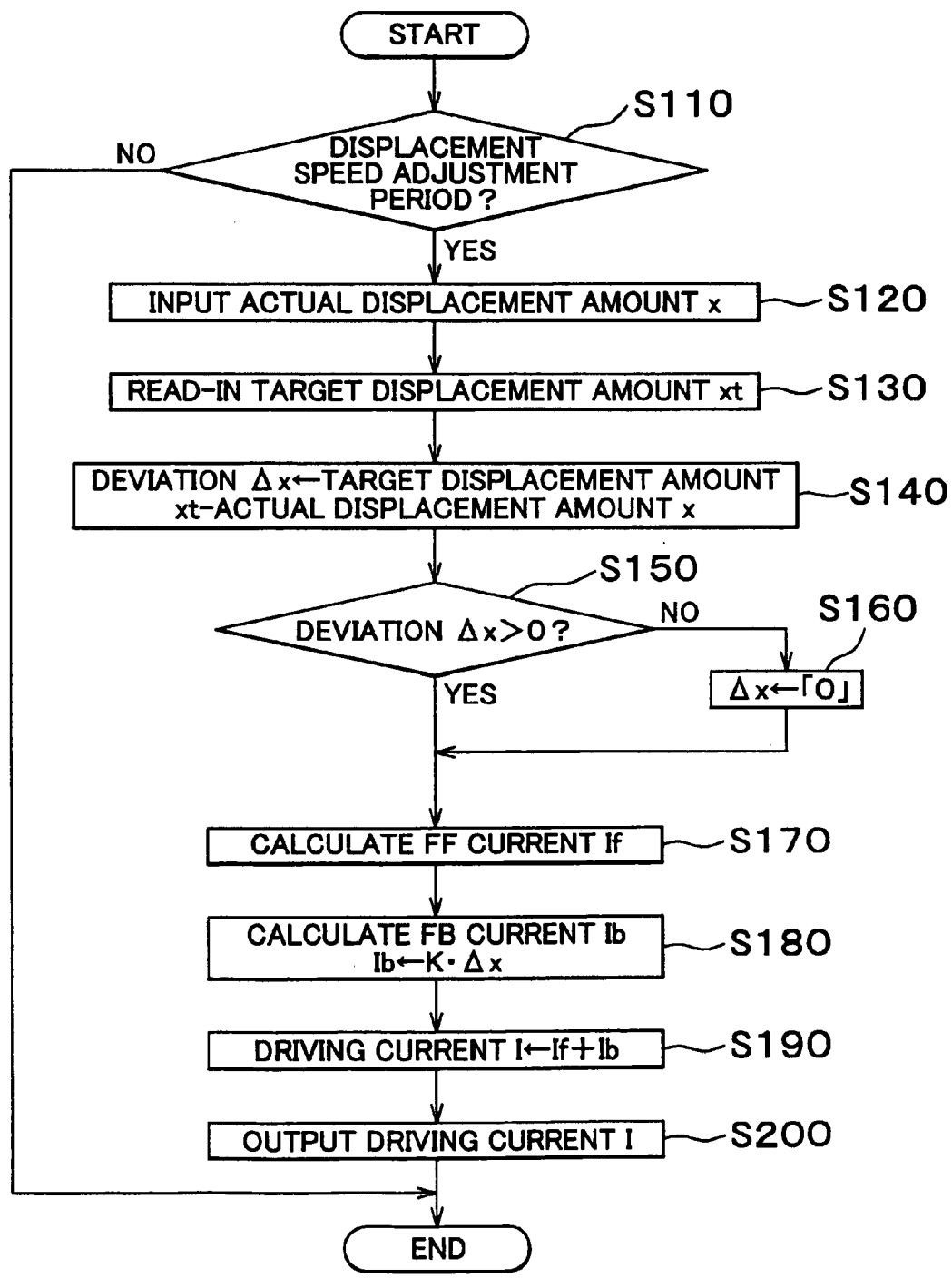
FIG. 4 is a flowchart showing an energization control procedure of an electromagnet according to a first embodiment.

FIG. 4 is a flowchart showing the procedure of the energization control of the first and the second electromagnets 61, 62. A series of steps shown in this flowchart is repeatedly carried out keeping a predetermined time interval Δt by the ECU 50.

According to the series of the steps, first, it is determined whether the present control cycle is within the displacement speed adjustment period (i.e., Step 110). When the present control cycle is not within the displacement speed adjustment period (i.e., Step 110: No), the series of the steps is finished.

On the other hand, when the present control cycle is within the displacement speed adjustment period (i.e., Step 110: Yes, timing t1–t2 of FIG. 3), an actual displacement amount (i.e., actual displacement amount x) of the valve body 19 is input (i.e., Step 120) based on the detection signal of the displacement amount sensor 52. The actual displacement amount x is determined to have a reference value (i.e., actual displacement amount x=0) when the valve body 19 is at the neutral position and shows the distance between the neutral position and the present position of the valve body 19.

After being input with the actual displacement amount x, a target displacement amount xt which is a target value of the actual displacement amount x is read-in (i.e., Step 130). The target displacement amount xt corresponds to the displacement amount when the valve body 19 is vibrated freely in the direction for opening the valve by the elastic force of the upper spring 38 from the fully closed position under the condition that the valve body 19 is affected only by the frictional resistance at sliding portion and is not affected by the external force varying the strength in accordance with the engine operation such as the cylinder pressure and the exhaust pressure (i.e., the displacement amount when the valve body 19 is freely vibrated in the direction for closing the valve by the elastic force of the lower spring 24 from the fully open position when closing the exhaust valve 10 under the condition that the valve body 19 is affected only by the frictional resistance). The target displacement amount xt is memorized in the ECU 50 as function data having an elapsed time from the start of opening or closing actuation of the exhaust valve 10 as a parameter.

According to the following formula (1), a deviation Δx between the target displacement amount xt and the actual displacement amount x is calculated (i.e., Step 140).

$$\Delta x = xt - x \qquad (1)$$

After calculating the deviation Δx, it is determined whether the deviation Δx is greater than zero (i.e. Step 150). When the deviation Δx is equal to or less than zero (i.e., Step 150: No), the deviation Δx is set to zero (i.e., Step 160) to determine the FB current Ib to be zero in a subsequent transaction because the valve body 19 is positioned on the valve closing side compared to the targeted position and it is not required to attract the valve body 19 in the direction for opening the valve by the electromagnetic force of the first electromagnet 61.

On the contrary, when the deviation Δx is greater than zero (i.e., Step 150: YES), it is required to decrease the displacement speed by attracting the valve body 19 in the direction for closing the valve by the first electromagnet 61 for closing actuation because the actual displacement amount x is less than the target displacement amount xt by the external force based on the cylinder pressure and the exhaust pressure.

Next, the FF current If (referring to FIG. 3(b)) is calculated as follows (i.e. Step 170). The FF current If is determined to have a value for maintaining the exhaust valve 10 at the fully closed condition (i.e., holding current) through a different transaction from the series of the transactions during the holding period preceding the displacement speed adjustment period.

As shown in FIG. 3(b), the FF current If is set to a constant value which has opposite directional force relative to the holding current until elapsing a predetermined time after the opening or closing actuation of the exhaust valve 10 (i.e., timing t1–t11 of FIG. 3) Accordingly, the residual electromagnetic forces of the upper core 32 and the armature 28 are cancelled, and the armature 28 is swiftly separated from the upper core 32 by the elastic force of the upper spring 38 to displace the valve body 19 in the direction for opening the valve. After elapsing of the predetermined time, the FF current IF is set to zero (i.e., after timing t11).

After calculating the FF current If, the Fb current Ib (referring FIG. 3(*c*)) is calculated based on the following formula (2) (Step 180).

$$Ib = Kp \cdot \Delta x \quad (2)$$

According to the formula (2), Kp stands for a feedback gain. The larger an air gap G is, that is, the larger the distance between the upper core 32 and the armature 28 of the first electromagnet 61 is, the larger feedback gain, because the larger the air gap G becomes, the more the proportion of the flux passing the armature 28 in the flux generated in the first electromagnet 61 is decreased, and accordingly is a corresponding large driving current must be supplied to the first electromagnet 61 to provide an electromagnetic force with the same strength to the armature 28 when the air gap G is large. Incidentally, when closing the valve body 19 at fully open position, the air gap G is the distance between the lower core 34 and the armature 28 of the second electromagnet 62.

After calculating the FF current If and the FB current Ib respectively, the sum of the FF electric current If and the FB current Ib is determined as the driving current I (referring to FIG. 3(*d*)) (i.e., Step 190). Then, the driving current I is supplied to the first electromagnet 61 (i.e., Step 200).

As shown in the formula (2), the Fb current Ib is determined in accordance with the deviation Δx. Under the actual condition in which the valve body 19 is affected with the external force based on the cylinder pressure and the exhaust pressure, in addition to the external force, the valve body 19 is affected with the own inertial force, the elastic force of the upper spring 38, the frictional resistance and the damping force at each sliding portion and so on. Since the state quantity of the valve body 19, that is, since the actual displacement amount x is varied in this case in accordance with the aforementioned force, the actual displacement amount x is deviated from the target displacement amount xt if only the FF current If is supplied to the first electromagnet 61.

Thus, in the first embodiment of the present invention, in order to conform the deviated actual displacement amount x to the target displacement amount xt, the strength of the FB current Ib is adjusted according to the formula (2) to supply the driving current I which is the sum of the FB current Ib and the FF current If to the first electromagnet 61.

After controlling the electromagnetic force of the first electromagnet 61 in the foregoing manner, the series of the transactions is finished. After the completion of the series of the transactions, the valve body 19 is further displaced by the elastic force of the upper spring 38 and reaches the position on the valve opening side by a predetermined amount relative to the neutral position. Then, the energization control for the second electromagnet 62 is performed through another transaction to securely attract the valve body 19 to the fully open position by the electromagnetic force of the second electromagnet 62.

Although the case for opening the valve body 19 of the exhaust valve 10 at the fully closed position is explained as foregoing, the electromagnetic force of the second electromagnet 62 is controlled in the same manner when closing the valve body 19 at fully open position. In case closing the valve body from the fully open position and opening the valve body from the fully closed position of an intake valve 11, the electromagnetic force of the first and the second electromagnets 61, 62 is controlled in the same manner.

According to the first embodiment of the present invention in which the electromagnetic force for actuating the valve body 19 is controlled in the foregoing manner, the following operational effects can be obtained.

(1) According to the first embodiment of the present invention, when actuating the valve body 19 and when the actual displacement amount x of the valve body 19 is deviated from the target displacement amount xt by the effect of the external force of the cylinder pressure and the intake and the exhaust pressure to the valve body 19, the electromagnetic force of the first and the second electromagnets 61, 62 is controlled in accordance with the deviation Δx between the actual displacement amount x and the target displacement xt. Accordingly, even when the external force is varied in accordance with the engine operation, the electromagnetic force of the first and the second electromagnets 61, 62 can be corrected each time to be appropriate strength in accordance with the variation of the external force, and thus the decline of the operational stability due to the bouncing at open-close operation can be restricted. Since the electromagnetic force of the first and the second electromagnets 61, 62 is controlled based on the deviation Δx and the electromagnetic force is corrected to be appropriate for the engine operation condition each time, it is not required to obtain the relationship between the engine operation condition and the corresponding electromagnetic force in advance through the experiments. Thus, the determination of the control constant can be simplified.

(2) Even when the engine operation condition is the same, the cylinder pressure when opening and closing the intake valve and the cylinder pressure when opening and closing the exhaust valve are different and the intake pressure and the exhaust pressure are different. Accordingly, when obtaining the relationship between the engine operation condition and the corresponding appropriate electromagnetic force for controlling the electromagnetic force of the first and the second electromagnets 61, 62 based on the obtained relationship, it is required to separately obtain the respective relationships between the engine operation condition and the electromagnetic force regarding the case for opening and closing the intake valve and for opening and closing the exhaust valve 10, which extremely complicates the constant determination. On the other hand, in the first embodiment, since the electromagnetic force of the first and the second electromagnets 61, 62 is feedback-controlled based on the deviation Δx between the actual displacement amount x and the target displacement amount xt of the valve body 19, the complicated determination is not required. Moreover, the electromagnetic forces of the first and the second electromagnets 61, 62 can be appropriately controlled using the same logic even when opening and closing the intake valve and when opening and closing the exhaust valve.

(3) According to the first embodiment of the present invention, since the displacement amount when the valve body 19 freely vibrated based on the elastic force of the lower spring 24 and the upper spring 38 under the condition that the valve body 19 is affected only by the frictional resistance is determined as the target displacement amount xt, the valve body 19 can be displaced from one displacement end to the other displacement end while restraining the strength of the electromagnetic force applied to the valve body 19 by the first and the second electromagnets 61, 62 to minimum. Thus, the power consumption when actuating the valve body 19 can be minimized.

(4) Since the appropriate driving current I is determined each time in accordance with the strength of the external force which actually affects the valve body 19, the power consumption when actuating the valve body 19 can be reduced compared to feed forward energization control, which requires obtaining the relationship between the engine operation condition and the corresponding electromagnetic force in advance through experiments for controlling the electromagnetic force of the first and the second electromagnets 61, 62.

(5) Further, since the feedback gain for calculating the FB current Ib is variably determined based on the distance of the air gaps G between the armature 28 and the upper and lower cores 32, 34 respectively of the first and the second electromagnets 61, 62, the FB current Ib can be calculated as the value which meets the distance of the air gaps G, and thus the appropriate strength of the electromagnetic force can be applied to the valve body 19 based on the FB current Ib. Consequently, the convergence of the actual displacement amount x relative to the target displacement amount xt can be improved.

Second Embodiment:

A second embodiment of the control apparatus of electromagnetic valve according to the present invention, particularly, the differences from the first embodiment will be explained as follows.

According to the second embodiment of the present invention, a physical model including the displacement amount of the valve body 19, the displacement speed of the valve body 19, and the force affecting the valve body 19 as model variables is structured. A required value of the electromagnetic force necessary for conforming the actual displacement amount x to the target displacement amount xt is calculated through the physical model. In practice, an equation of motion for simulating the behavior of the actuating valve body 19 is obtained, the electromagnetic force required value is calculated by performing the response analysis of the valve body 19 based on the equation of motion, and the FB current Ib is calculated based on the electromagnetic force required value.

Figure 5:
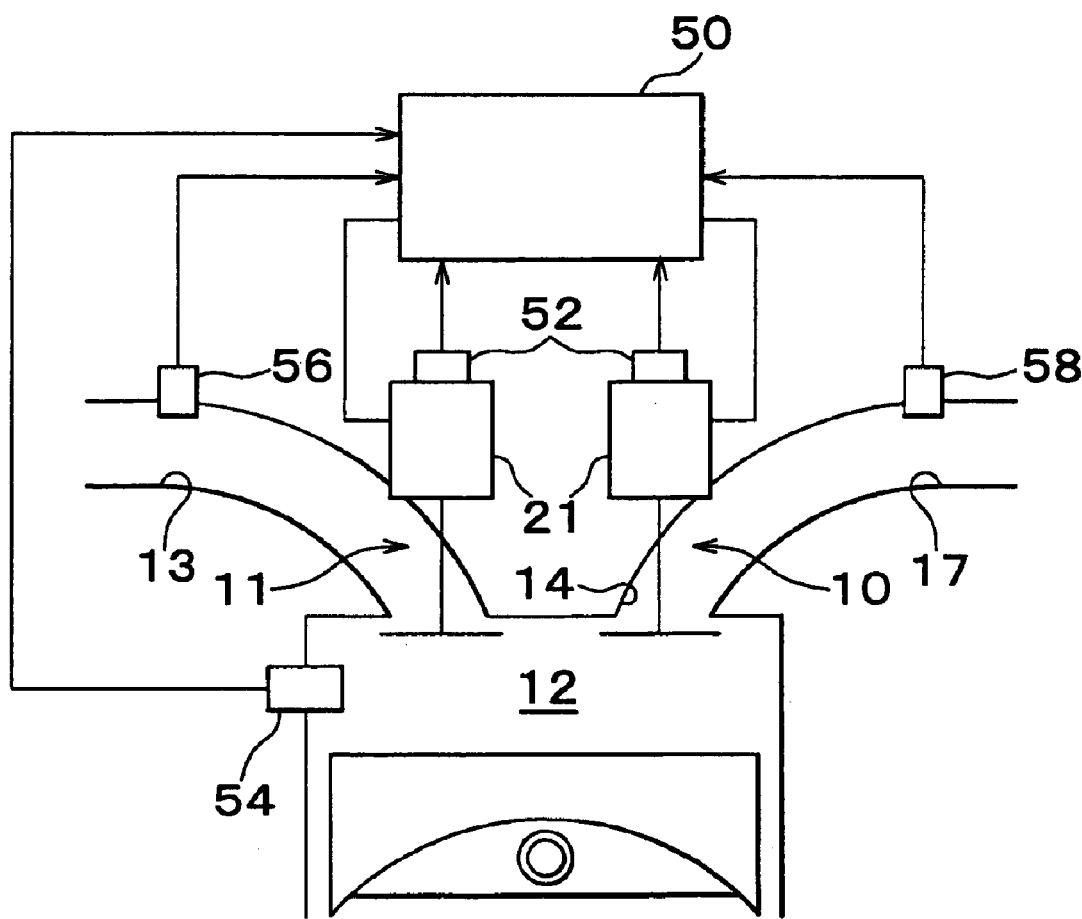
FIG. 5 is a partial overview of the internal combustion engine with the controller according to a second embodiment.

As shown in FIG. 5, the engine with the control apparatus of the electromagnetic valve according to the second embodiment includes a cylinder pressure sensor 54 for detecting the cylinder pressure, an intake pressure sensor 56 for detecting the internal pressure (i.e., intake pressure) of an intake passage 13, and an exhaust pressure sensor 58 for detecting the internal pressure (i.e., exhaust pressure) of an exhaust passage 17. The intake pressure sensor 56 is also used as the sensor for detecting the intake air volume in an air-fuel ratio control, etc. Although the cylinder pressure sensor 54 is provided for estimating the external force affecting the valve body 19, in the internal combustion engine including a combustion pressure sensor for detecting the maximum cylinder pressure during the combustion process, that is, for detecting the combustion pressure, the combustion pressure sensor serves as the cylinder pressure sensor 54 as well.

Figure 6:
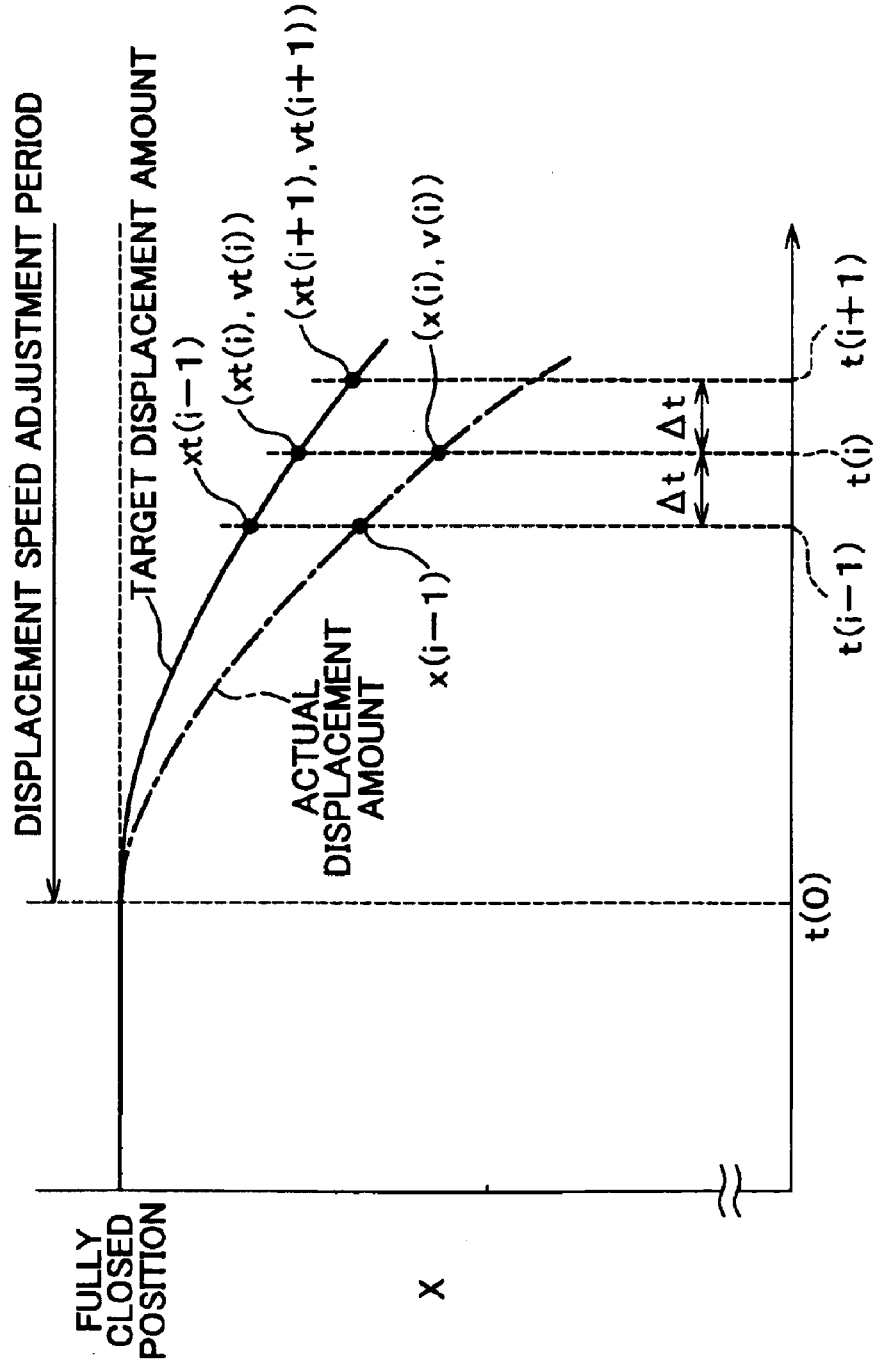
FIG. 6 is a timing chart for explaining the second embodiment and for showing a target displacement amount and an actual displacement amount versus time when the displacement of the valve body at fully closed position in the direction for opening the valve starts from an opening actuation start period.
Figure 7:
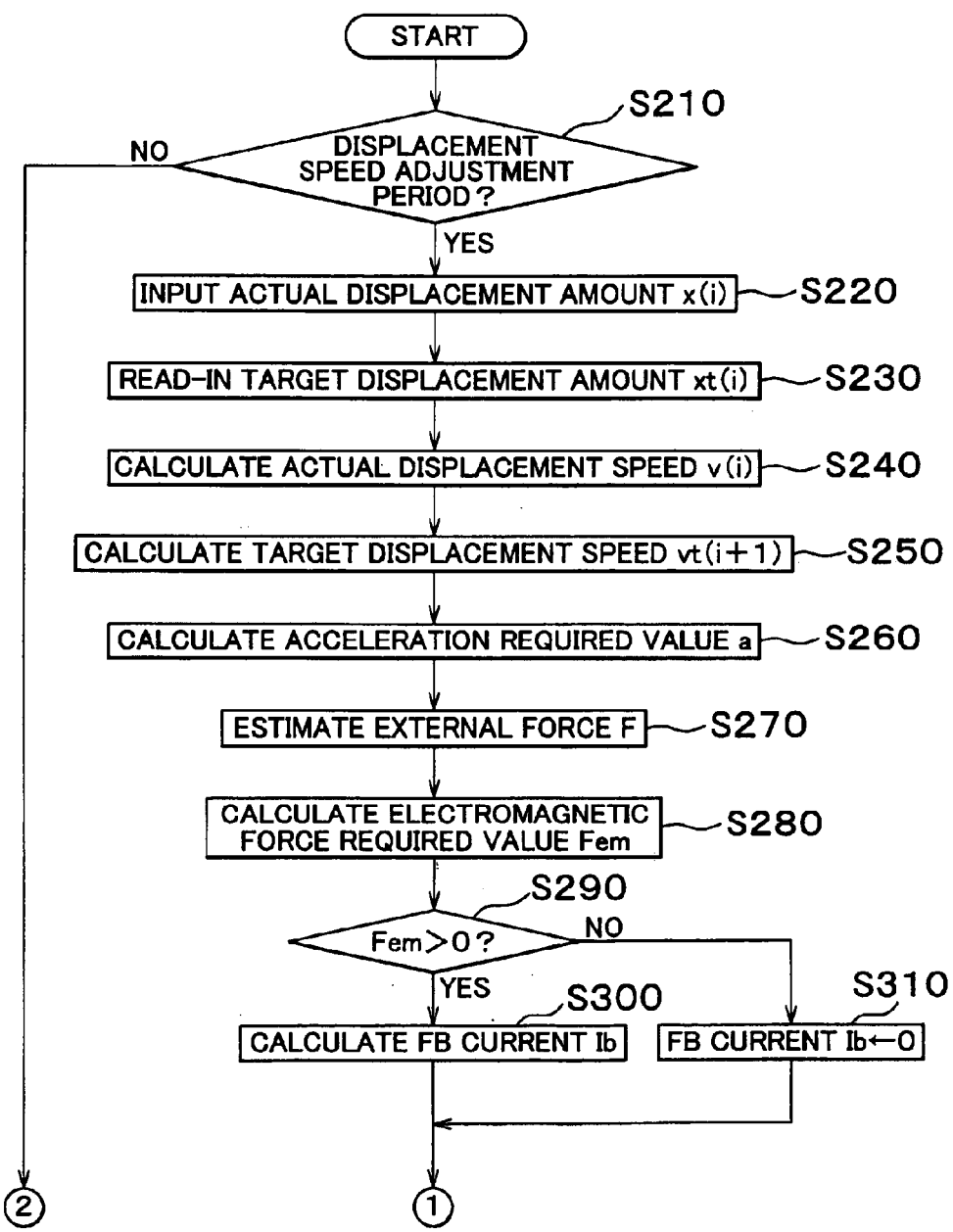
FIG. 7 is a flowchart showing the energization control procedure of the electromagnet according to the second embodiment.
Figure 8:
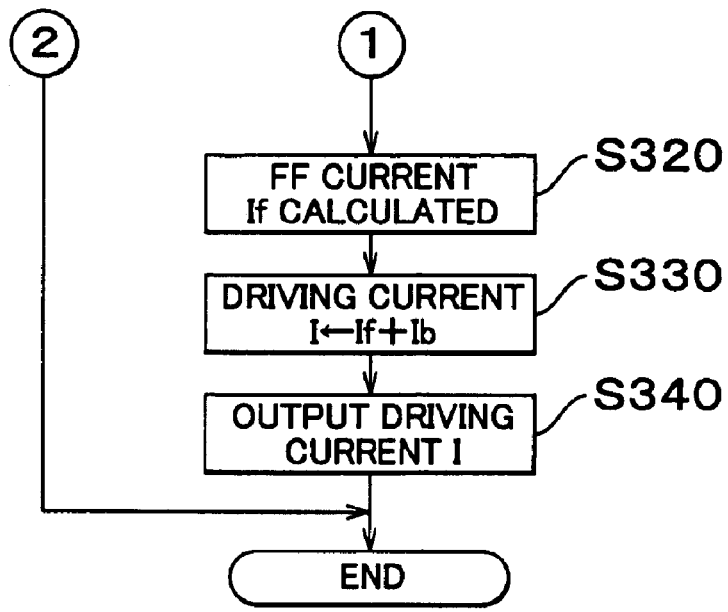
FIG. 8 is the flowchart showing the energization control procedure of the electromagnet continuing from the flowchart of FIG. 7.

The procedure when controlling the energization of the electromagnets 61, 62 during the displacement speed adjustment period will be explained referring to FIGS. 6–8 regarding the case for opening the valve body 19 of the exhaust vale 10 at the fully closed position. FIG. 6 is a timing chart showing the time shift of the target displacement amount xt (i.e., shown with a solid line) and the actual displacement amount x (i.e., shown with a chained line) regarding the case in which the displacement of the valve body 19 at the fully closed position in the direction for opening valve starts from an opening actuation starting time (i.e. timing t(0)). FIGS. 7–8 are the flowcharts showing the procedure of the control of the energization of the first and the second electromagnets 61, 62. A series of steps shown in the flowcharts is repeatedly carried out keeping a predetermined time interval $\Delta t$ by the ECU.

In the series of the steps, when it is determined that a present control cycle t(i) is within the displacement speed adjustment period (i.e., Step 210: Yes), an actual displacement amount x(i) is input (i.e., Step 220), and a target displacement amount xt(i) is input (i.e., Step 230). Then, an actual displacement speed v(i) at the present control cycle t(i) is calculated based on the following formula (3) (i.e. Step 240).

$$v(i)=(x(i)-x(i-1))/\Delta t \qquad (3)$$

According to the forgoing formula (3), "x(i−1)" corresponds to the actual displacement amount of a previous control cycle t(i−1) (i.e., equal to t(i)−$\Delta t$) (shown in FIG. 6).

In order to reduce the influence of the noise mixed in the detection signal of the displacement sensor 52, it is preferable to further apply a filter step for removing the high frequency element of the noise from the displacement amount signal prior to calculating the actual displacement speed v(i) using formula (3).

In the next step, a next target displacement speed vt(i+1) at a next control cycle t(i+1) (i.e., equal to t(i)+$\Delta t$) is calculated according to the following formula (4) (i.e. Step 250).

$$vt(i+1)=(xt(i+1)-xt(i))/\Delta t \qquad (4)$$

According to the formula (4), "xt(i+1)" corresponds to the target displacement amount at the next control cycle t(i+1) (shown in FIG. 6). As the target displacement amount xt(i+1) at the next control cycle t(i+1), the value corresponding to the elapsed time (i.e., equal to t(i+1)−t(0)) from the opening actuation starting time t(0) to the next control cycle t(i+1) is read-in from the ECU 50. Since the target displacement amount xt corresponding to the elapsed time has been already known, a target displacement speed vt(i+1) at the next control cycle t(i+1) may be calculated by properly differentiating the functional data regarding the target displacement amount x memorized in the ECU 50 and the target displacement amount xt.

After calculating the actual displacement speed v(i) at the present cycle t(i) and the target displacement speed vt(i+1) at the next control cycle t(i+1), an acceleration required value "a" of the valve body 19 necessary for conforming the actual displacement speed v(i) to the target displacement speed vt(i+1) by the next control cycle t(i+1) is calculated (i.e., Step 260).

$$a=(vt(i+1)-v(i))/\Delta t \qquad (5)$$

From the foregoing formula (5), according to the second embodiment of the present invention, the acceleration required value "a" is calculated based on the deviation between the actual displacement speed "v" and the target displacement speed vt, that is, based on a deviation (vt−v) in this case.

According to the following formula (6), an external force F affecting the valve body 19 is estimated (i.e. Step 270).

$$F=Fp+Ff \qquad (6)$$

According to the foregoing formula (6), "Fp" corresponds to the force affecting the valve body 19, particularly, the umbrella portion 16 based on the cylinder pressure and the exhaust pressure, which is calculated according to the following formula (7). In the case of estimating the force affecting the valve body of the intake valve 11, the intake pressure detected by the intake pressure sensor 56 is applied instead of the exhaust pressure.

$$Fp = K_1 \cdot (Pc - Pe) \tag{7}$$

$K_1$: constant
Pc: cylinder pressure
Pe: exhaust pressure

According to the foregoing formula (6), "Ff" corresponds to the frictional resistance at each sliding portion of the exhaust valve 10, which is a constant value obtained in advance by the experiment. The strength of the frictional resistance is varied in accordance with the lubrication condition of the sliding portions, particularly, the temperature of the lubrication oil. Thus, for example, the frictional resistance Ff can be obtained by determining the frictional resistance Ff as a function of the engine temperature, by determining that the lower the engine temperature (estimated by the engine cooling water temperature), the larger the frictional resistance Ff.

By modeling the exhaust valve 10 as spring/mass vibration system, the following equation of motion (8) can be obtained.

$$m \cdot a + c \cdot v(i) + k \cdot x(i) = F + Fem \tag{8}$$

According to the dynamic equitation (8), "m" corresponds to a mass of the spring/mass vibration system model determined based on the mass of the movable portion of the valve body 19 and the exhaust valve 10. "c" corresponds the damping constant of the spring/mass vibration system model determined based on the resistance force generated in accordance with the sliding speed at the sliding portion of the exhaust valve 10. Further, "k" corresponds to a spring constant of the spring/mass vibration system model determined based on the elastic force characteristics of the upper spring 38 and the lower spring 24. "Fem" corresponds to the electromagnetic force required value of the first electromagnet 61 required for conforming the actual displacement speed $v(i)$ of the valve body 19 to the target displacement speed $vt(i+1)$.

The following formula (9) is obtained from the dynamic equation (8). Based on formula (9), the electromagnetic force required value Fem is calculated (Step 280).

$$Fem = m \cdot a + c \cdot v(i) + k \cdot x(i) - F \tag{9}$$

It is determined whether the electromagnetic force required value Fem is greater than zero (i.e. Step 290). If the electromagnetic force required value Fem is equal to or less than zero (i.e., Step 290: No), the FB current Ib is set to zero (i.e. Step 310) because it is not required to attract the valve body 19 in the direction for opening the valve body 19 by the electromagnetic force of the first electromagnet 61.

Figure 9:
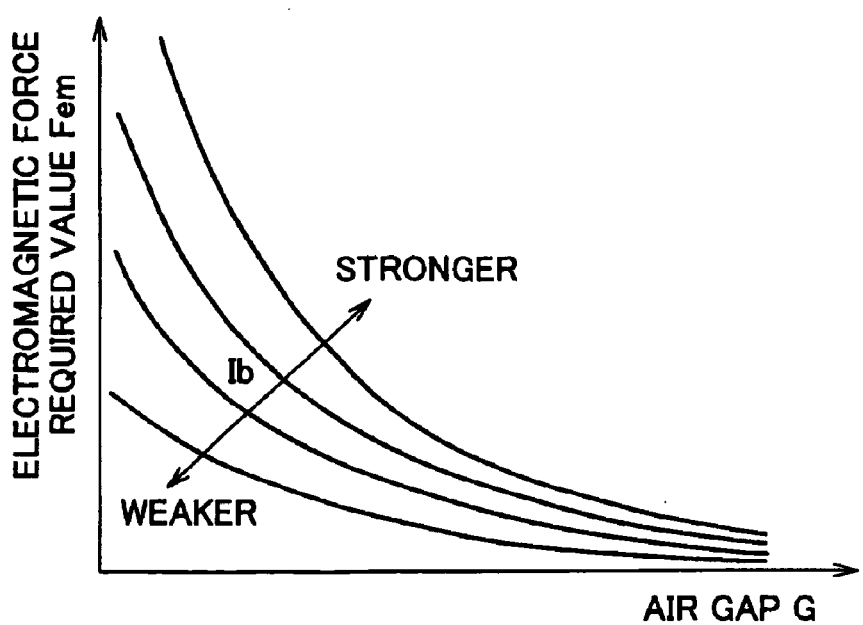
FIG. 9 is a calculation map showing a relationship between an electromagnetic force required value, an air gap, and a feedback electric current.

On the other hand, when the electromagnetic force required value Fem is greater than zero (i.e., Step 290: Yes), the FB current Ib is calculated based on the electromagnetic force required value Fem (i.e. Step 300). FIG. 9 is a map showing the relationship between the electromagnetic force required value Fem, the air gap G, and the FB current Ib referred for the calculation of the FB current Ib. The relationship shown in the map is memorized in the ECU 50 in advance as the function data.

As shown in FIG. 9, the larger electromagnetic force required value Fem and the longer the air gap G are, the larger the FB current Ib is determined. Because of the following relationship regarding the electromagnetic force required value Fem, the air gap G, and the FB current Ib shown in the following formula (10), it is arranged to determine the FB current in the foregoing manner.

$$Fem \propto (Ib/G)^2 \tag{10}$$

As in Step 170 shown in FIG. 4, the FF current If is calculated (i.e., Step 320). The sum of the FF current If and the FB current Ib (i.e., If+Ib) is then determined to be the driving current I (i.e. Step 330), and the driving current I is supplied to the first electromagnet 61 (i.e., Step 340). After controlling the electromagnetic force of the first electromagnet 61 or when it is determined that the present control cycle t(i) is not within the displacement speed adjustment period in the Step 210 (i.e. Step 201: No), the series of the steps is finished.

Although the case for opening the valve body 19 of the exhaust valve 10 at the fully closed position has been explained, when closing the valve body 19 at the fully open position, the electromagnetic force of the second electromagnet 62 is controlled in the same manner. In the case of closing the valve body from the fully open position and opening the valve body from the fully closed position of the intake valve 11, the electromagnetic force of the first and the second electromagnets 61, 62 is controlled in the same manner. Although the equation of motion of the exhaust valve 10 can be applied when structuring an equation of motion of the intake valve 11, it is preferable to determine each model constant m, c, k, in accordance with specification of the intake valve 11 in order to perform the control with higher precision.

According to the second embodiment of the present invention in which the electromagnetic force for actuating the valve body 19 is controlled in the forgoing manner, in addition to the operational effects (2)–(4) mentioned in the first embodiment, the following operational effects can be achieved.

(6) According to the second embodiment of the present invention, the acceleration required value "a" is determined in accordance with the state quantity of the valve body 19 varied in accordance with the various force affecting the valve body 19, that is, in accordance with the deviation (vt−v) between the actual displacement speed "v" of the valve body 19 and the target value (i.e. target displacement speed vt). The electromagnetic force required value Fem of the first and the second electromagnets 61, 62 is calculated based on the equation of motion including the acceleration required value "a" as a parameter. Accordingly, in the case when the actual displacement speed "v" of the valve body 19 deviates from the target displacement speed vt by the effects of the external force to the valve body 19 due to the cylinder pressure and the intake pressure and the exhaust pressure when actuating the valve body 19, the electromagnetic force of the first and the second electromagnets 61, 62 is controlled in accordance with the electromagnetic force required value Fem so that the actual displacement speed "v" conforms to the target displacement speed vt. Thus, even when the external force is varied in accordance with the engine operation, the electromagnetic force of the electromagnets 61, 62 can be corrected to the appropriate strength each time, and thus to reduce the decrease of the operational stability due to the bouncing at open-close operation. Since the electromagnetic force of the first and the second electromagnets 61, 62 is controlled based on the electromagnetic force required value Fem to correct the electromagnetic force to be appropriate for the engine operation condition each time, it is not longer required to obtain the relationship between the engine operation condition and the corresponding appropriate electromagnetic force in advance through experiments. Thus, the determination of control constants can be simplified.

(7) According to the second embodiment of the present invention, the electromagnetic force required value Fem is calculated from the model (i.e. equation of motion) modeling the exhaust valve 10 or the intake valve 11 as spring/mass vibration system. Thus, compared to the case that the Fb current Ib is calculated based on the deviation Δx between the actual displacement amount x and the target displacement amount xt, the strength of the FB current Ib can be determined while confirming the dynamic behavior for the valve body 19. Consequently, the displacement speed can be decreased by applying the appropriate electromagnetic force to the valve body 19 based on the FB current Ib. As a result, the convergence of the actual displacement amount x and the actual displacement speed "v" of the valve body 19 relative to the target displacement amount xt and the target displacement speed vt can be improved.

(8) According to the second embodiment of the present invention, since the FB current Ib is variably determined based on the distance of the air gap G even if the electromagnetic force required value Fem is the same when calculating the FB current Ib from the electromagnetic force required value Fem, the FB current Ib can be calculated as the value corresponding to the distance of the air gap G, and the appropriate strength of the electromagnetic force can be provided to the valve body 19 based on the FB current Ib. As a result, the convergence of the actual displacement amount x and the actual displacement speed "v" of the valve body 19 relative to the target displacement amount xt and the target displacement speed vt can be further improved.

Third Embodiment:

A third embodiment of the control apparatus of the electromagnetic valve according to the present invention, particularly, regarding the differences from the second embodiment will be explained as follows.

In the second embodiment, the actual displacement speed "v" is calculated based on the formula (3) (i.e., Step 240 of FIG. 7). The force affecting the valve body 19 in accordance with the engine operation, that is, the force affecting the valve body 19 in accordance with the differential pressure between the cylinder pressure and the exhaust pressure regarding the exhaust valve 10 or the force affecting the valve body 19 in accordance with the differential pressure between the cylinder pressure and the intake pressure regarding the intake valve 11 is estimated based on the cylinder pressure, the exhaust pressure, and the intake pressure detected by the pressure sensors 54, 56, 58 respectively. The external force F affecting the valve body 19 is estimated by adding the force affecting the valve body 19 and the frictional resistance at the sliding portion (i.e., Step 270 of FIG. 7).

On the other hand, in the third embodiment of the present invention, an observer for observing the internal condition of the valve body 19 based on a spring/mass vibration system model for simulating the opening and closing behavior of the valve body 19 is determined. By utilizing the observer, the actual displacement speed "v" of the valve body 19 is estimated, and a resultant force (i.e., external force F) of the force Fp affecting the valve body 19 in accordance with the differential pressure between the cylinder pressure and the exhaust pressure or between the cylinder pressure and the intake pressure and the frictional resistance Ff at the sliding portion of the valve body 19 is estimated. Thus, in the control apparatus of the electromagnetic valve according to the third embodiment of the present invention, the cylinder pressure sensor 54 and the exhaust pressure sensor 58 are excluded. The intake pressure sensor 56 is used for the air-fuel ratio control.

The procedure for estimating the external force by the observer will be explained regarding the case estimating the external force affecting the valve body 19 of the exhaust valve 10.

The following equation of motion (11) can be obtained by modeling the exhaust valve 10 as spring/mass vibration system. In the equation of motion (11), the model constants "m", "c", "k" are the same with the defined ones in the equation (8). "x" corresponds to the displacement amount of the valve body 19. "u" corresponds to a control input of the spring/mass vibration system model, that is, the electromagnetic force of the first and the second electromagnets 61, 62. "w" corresponds to the external force affecting the valve body 19, which is the resultant force of the force affecting the valve body 19 in accordance with the differential pressure between the cylinder pressure and the exhaust pressure and the frictional resistance at the sliding portion of the valve body 19.

$$m\ddot{x}+c\dot{x}+kx=w+u \quad (11)$$

A state variable X is defined as shown in the following formula (12).

$$X = \begin{pmatrix} x \\ \dot{x} \\ w \end{pmatrix} \quad (12)$$

According to the formulas (11), (12), the following formula (13) is obtained concerning the spring/mass vibration system model of the exhaust valve 10.

$$\dot{X} = A \cdot X + B \cdot u \quad (13)$$

$$A = \begin{pmatrix} 0 & 1 & 0 \\ -k/m & -c/m & 1/m \\ 0 & 0 & 0 \end{pmatrix}$$

$$B = \begin{pmatrix} 0 \\ 1/m \\ 0 \end{pmatrix}$$

On the other hand, an output equation of the spring/mass vibration system model of the exhaust valve 10 will be as the following formula (14).

$$Y = C \cdot X \quad (14)$$

$$C = (1\ 0\ 0)$$

When an estimated value of the state variable X is determined to be Z, an observer for obtaining the estimated value Z will be as the following formula (15). According to the formula (15), L corresponds to an observer gain.

$$\dot{Z} = A \cdot Z + B \cdot u + L \cdot (Y - C \cdot Z) \quad (15)$$

-continued $$Z = \begin{pmatrix} \bar{x} \\ \bar{\dot{x}} \\ \bar{w} \end{pmatrix}$$

($\bar{x}$, $\bar{\dot{x}}$, $\bar{w}$ correspond to the estimated values of x, $\dot{x}$, w)

An estimation error "e" between the state variable X and the estimated value (i.e., X−Z) is obtained according to the following formula (16) obtained from the formulas (13)–(15).

$$\dot{e} = (A - L \cdot C) e \quad (16)$$

Accordingly, by properly designing the observer gain L so that the estimation error "e" obtained according to the formula (16) converges on zero, the estimated value Z can be calculated from the formula (15). In other words, the displacement speed (i.e., the actual displacement speed "v") of the valve body 19 can be estimated. Thus, for example, when the control input "u" is determined to be zero in the formulas (13), (15), the external force "w" is estimated. The estimated external force "w" corresponds to the sum of the force Fp affecting in accordance with the differential pressure between the cylinder pressure and the exhaust pressure, the frictional resistance Ff, and the electromagnetic force of the first and the second electromagnets 61, 62. Accordingly, by subtracting the electromagnetic force presently generated in the first and the second electromagnets 61, 62 from the estimated external force "w", the external force F, which is the resultant force of the force Fp affecting in accordance with the differential pressure between the cylinder pressure and the exhaust pressure and the frictional resistance Ff, can be estimated.

According to the third embodiment of the present invention, the acceleration required value "a" is calculated based on the actual displacement speed "v" of the valve body 19 estimated via the observer and the target displacement speed vt calculated from the formula (4) (i.e. Step 260 of FIG. 7). The electromagnetic force required value Fem is calculated based on the acceleration required value "a" and the external force F estimated via the observer (i.e. Step 280). The FB current Ib is calculated from the electromagnetic force required value Fem, then the energization of the first and the second electromagnets 61, 62 is selectively controlled based on the driving current I obtained from the FB current Ib and the FF current If (i.e. Step 290–340).

Although the third embodiment of the present invention is explained regarding the case for estimating the external force affecting the valve body 19 of the exhaust valve 10, the external force affecting the valve body of the intake valve 11 can be obtained according to the same procedure. Although the equation of motion of the exhaust valve 10 can be applied when structuring an equation of motion of the intake valve 11, it is preferable to determine each model constant m, c, k, in accordance with specification of the intake valve 11 in order to perform the control with higher precision.

According to the third embodiment of the present invention in which the electromagnetic force for actuating the valve body 19 is controlled in the forgoing manner, in addition to the operational effects mentioned in the first and the second embodiments, the following operational effects can be achieved.

(9) Since the observer for observing the internal condition of the valve body 19 based on the spring/mass vibration system model for simulating the opening and closing behavior of the valve body 19 is adopted and the external force affecting the valve body 19 is estimated using the observer, it is not required to additionally provide the sensors for estimating the external force such as the cylinder pressure and the exhaust pressure. Thus, the structure of the control apparatus of the electromagnetic valve can be simplified.

(10) According to the third embodiment of the present invention, the external force F can be precisely estimated not only in accordance with the force varied in accordance with the engine operation but also in accordance with the fluctuation of the frictional resistance at the sliding portion of the valve body 19 even when the frictional resistance at the sliding portion of the valve body 19 is varied, for example, in accordance with the engine temperature. Accordingly, the higher estimation precision when estimating the external force F can be achieved, and the convergence of the actual displacement amount x and the actual displacement speed "v" relative to the target displacement amount xt and the target displacement speed vt can be improved.

(11) When the actual displacement speed "v" of the valve body 19 is calculated by differentiating the detection signal of the displacement amount sensor 52 as shown in the formula (3), and when the noise is mixed in the detection signal of the displacement amount sensor 52, the calculation precision may decrease because the influence of the noise is emphasized through the differentiation. According to the third embodiment, since the actual displacement speed "v" of the valve body 19 can be also estimated by utilizing the observer, the influence by the noise can be restricted. Thus, the convergence of the actual displacement amount x and the actual displacement speed "v" relative to the target displacement amount xt and the target displacement speed vt can be further improved.

Fourth Embodiment:

A fourth embodiment of the control apparatus of elctromagnetic valve according to the present invention, particularly, the differences from the second embodiment of the present invention, will be explained as follows.

The difference between the second embodiment and the fourth embodiment is that, in the fourth embodiment, the physical model of the valve body 19 is formed based on not the equation of motion but based on the principle of energy conservation.

In practice, an actual mechanical energy amount (i.e., the sum of the dynamic energy amount and the elastic energy amount) of the valve body 19 is calculated as the state quantity of the valve body 19 varied in accordance with the various force affecting the valve body 19. In addition, a target mechanical energy amount which is the target value of the actual mechanical energy amount is determined to calculate a deviation between the target mechanical energy amount and the actual mechanical energy amount. Further, the electromagnetic force required value is calculated based on the energy amount deviation and the principle of energy conservation with regard to the valve body 19. Since it is not required to estimate the external force F based on the detection result of the pressure sensors 54, 56, 58, the cylinder pressure sensor 54 and the exhaust pressure sensor 58 are excluded. The intake pressure sensor 56 is used for the air-fuel ration control.

Figure 10:
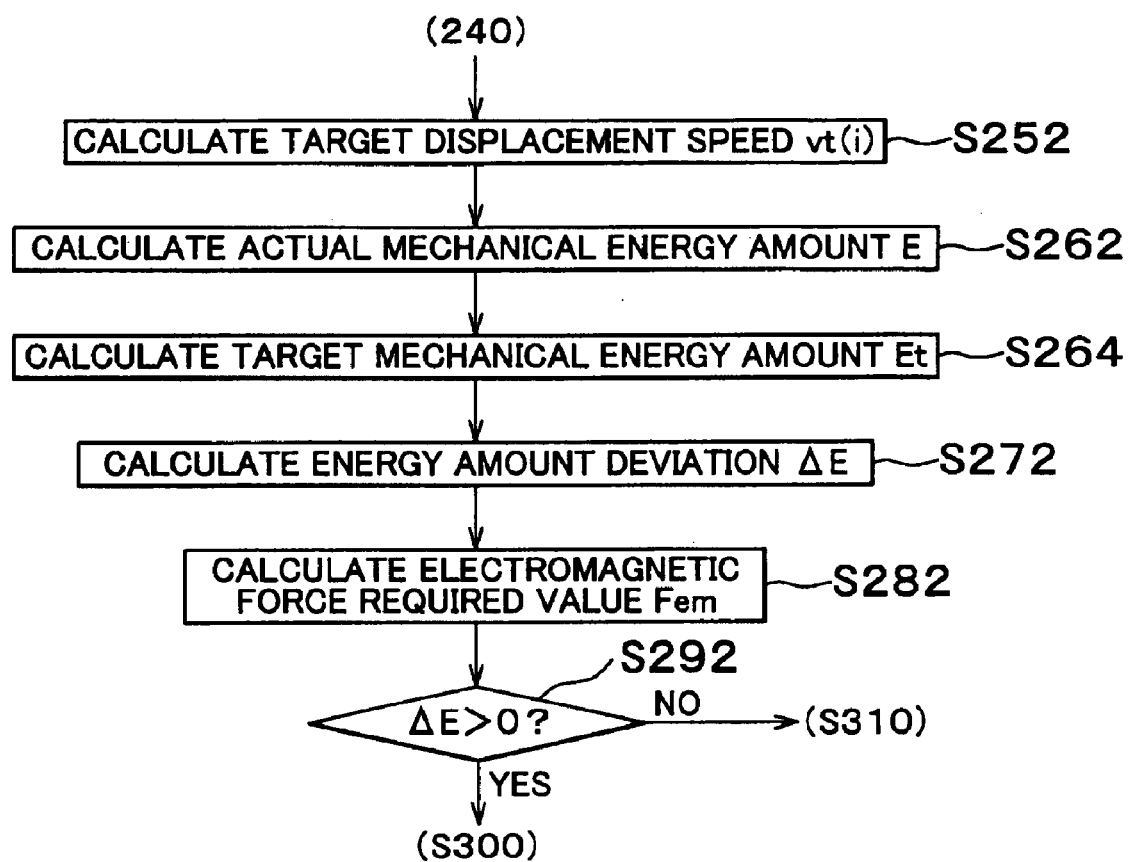
FIG. 10 is a flowchart showing an energization control procedure of the electromagnet according to a fourth embodiment.

The procedure for controlling the energization of the first and the second electromagnets 61, 62 during the displacement speed adjustment period will be explained referring to the timing chart of FIG. 6 and the flowchart of FIG. 10 regarding the case for opening the valve body 19 of the exhaust valve 10 at the fully closing position. In the controller of the electromagnetic valve according to the fourth embodiment of the present invention, a part of the process shown in the flowcharts of FIGS. 7–8 is performed differently. FIG. 10 shows the changed steps.

According to the process shown in FIG. 7, after each performance of Step 210–240, a target displacement speed vt(i) at the present control cycle t(i) is calculated (i.e., Step 252) based on, for example, the following formula (17).

$$vt(i)=(xt(i)-xt(i-1))/\Delta t \qquad (17)$$

According to the formula (17), xt(i−1) corresponds to the target displacement amount of a the previous control cycle t(i−1) (referring to FIG. 6). Since the target displacement amount xt corresponding to the elapsed time is already known, the target displacement speed vt(i) at the present control cycle t(i) may be calculated by properly differentiating the functional data regarding the target displacement amount xt memorized in the memory of the ECU 50. The target displacement speed vt(i+1) at the next control cycle t(i+1) (i.e., Step 250 of FIG. 7) may be similarly calculated.

An actual mechanical energy amount E of the valve body 19 at the present control cycle t(i) is calculated based on the following formula (18) (i.e., Step 262).

$$E = \frac{1}{2}m \cdot v(i)^2 + \frac{1}{2}k \cdot x(i)^2 \qquad (18)$$

The first term of the right side of the foregoing formula (18) corresponds to the dynamic energy amount. "m" corresponds to a constant determined based on the mass of the movable portion of the exhaust valve 10 such as the valve body 19. The second term of the right side of the foregoing formula (18) corresponds to the elastic energy amount. "k" corresponds to a constant determined based on the elastic characteristics of the upper spring 38 and the lower spring 24.

According to the following formula (19), a target mechanical energy amount Et at the present control cycle t(i) is calculated (i.e., Step 264).

$$Et = \frac{1}{2}m \cdot vt(i)^2 + \frac{1}{2}k \cdot x(i)^2 \qquad (19)$$

Thus, after the actual mechanical energy amount E and the target mechanical energy amount Et are calculated respectively, an energy amount deviation ΔE between the actual mechanical energy amount E and the target mechanical energy amount Et is calculated based on the formula (20) (i.e., Step 272).

$$\Delta E = E - Et \qquad (20)$$

The energy amount deviation ΔE is varied in accordance with the external force affecting the valve body 19 such as the force affecting in accordance with the engine operation and the frictional resistance at the sliding portion. The larger the workload when the valve body 19 is attracted in the direction for opening the valve by the external force based on the cylinder pressure, etc., the larger the energy amount deviation ΔE. For example, when no external force affects the valve body 19, the mechanical energy amount of the valve body 19 is always constant and never changes. However, in practice, the mechanical energy amount of the valve body 19 is varied by the influence of the external force, and the deviation is generated between the actual mechanical energy amount E and the target mechanical energy amount Et. Accordingly, by obtaining the energy amount deviation ΔE between the actual mechanical energy amount E and the target mechanical energy amount Et to determine the electromagnetic force required value Fem based on the energy amount deviation ΔE, the electromagnetic force can be controlled without directly obtaining the external force and by reflecting the influence of the external force.

In this case, actual control manner will be as follows. That is, in order to conform the actual mechanical energy amount E to the target mechanical energy amount Et at the present control cycle t(i), is it required to cancel the energy amount deviation ΔE by the work (i.e., workload Fem (xt(i)−x(i)) achieved via the electromagnetic force of the first and the second electromagnets 61, 62. That is, it is necessary that the relationship shown in the following formula (21) is realized between the energy amount deviation ΔE and the workload Fem (xt(i)−x(i)).

$$\Delta E = Fem(xt(i)-x(i)) \qquad (21)$$

Accordingly, the electromagnetic force required value Fem is calculated based on the following formula (22) obtained from the formula (21) (i.e., step 282).

$$Fem = \Delta E/(xt(i)-x(i)) \qquad (22)$$

After the electromagnetic force required value Fem is calculated, it is determined whether the energy amount deviation ΔE is greater than zero (i.e. Step 292). When the energy amount deviation ΔE is equal to or less than zero (i.e., Step 292: No), the workload achieved by the valve body 19 by the external force based on the cylinder pressure is small and the valve body 19 is not being displaced in the direction for opening valve with excessively high speed. Thus, in this case, since it is not required to attract the valve body 19 in the direction for closing the valve by the electromagnetic force of the first electromagnet 61 (the electromagnet for closing actuation), the FB current Ib is set to zero (i.e., Step 310).

On the other hand, when the energy amount deviation ΔE is greater than zero (i.e., Step 292: Yes), it is required to decline the displacement speed of the valve body 19 by attracting the valve body 19 in the direction for opening the valve. Thus, in this case, the FB current Ib is calculated based on the electromagnetic force required value Fem (ie., Step 300).

Then, the driving current I is calculated through steps 320–340 shown in FIG. 8, and the energization of the first electromagnet 61 is controlled based on the driving current I.

Although the case for opening the valve body 19 of the exhaust valve 10 at the fully closed position is explained as described above, the electromagnetic force of the second electromagnet 62 is controlled in the same manner when closing the valve body 19 at fully open position. When closing the valve body of the intake vale 11 and when opening the valve body of the intake valve 11 from the fully closed position, the electromagnetic force of the first and the second electromagnets 61, 62 is controlled in the same manner.

Although the equation of motion of the exhaust valve 10 can be applied when structuring an equation of motion of the intake valve 11, it is preferable to determine each model constant m, k, in accordance with specification of the intake valve 11 in order to perform the control with higher precision.

According to the fourth embodiment of the present invention in which the electromagnetic force for actuating the valve body 19 is controlled in the forgoing manner, in addition to the operational effects mentioned in the second embodiment and the operational effect mentioned in (9) of the third embodiment, the following operational effects can be achieved

(12) According to the fourth embodiment of the present invention, the electromagnetic force required value is calculated using the principle of the energy conservation. According to this calculation, the influence of the external force affecting the valve body 19 such as the force effecting in accordance with the engine operation and the frictional resistance of the sliding portion is reflected as the degree of the energy amount deviation ΔE. Thus, it is not required to directly estimate the external force per se. Accordingly, it is not required to additionally provided the sensors for estimating the external force and the structured of the control apparatus of the electromagnetic valve can be simplified.

Fifth Embodiment:

A fifth embodiment of the control apparatus of electromagnetic valve according to the present invention, particularly, the differences from the first embodiment will be explained as follows.

According to the first embodiment, the displacement amount when freely vibrating the valve body 19 from the fully closed position or from the fully open position based on the elastic force of each spring 24, 38 under the condition that the valve body 19 is affected only by the frictional resistance at the sliding portion and is not affected by the external force varying in accordance with the engine operation condition is determined as the target displacement amount xt. In the first embodiment, when the actual displacement amount x deviates from the target displacement amount, the FB current Ib is determined to be the appropriate strength to cancel the deviation Δx therebetween. The effects by the external force based on the cylinder pressure and the intake and the exhaust is a main cause of the deviation of the actual displacement amount x from the target displacement xt.

In light of the foregoing, according to the fifth embodiment, the external force is estimated based on the spring/mass vibration system model for simulating the opening and closing behavior of the valve body 19, by generating the electromagnetic force with directional force opposite to the first or the second electromagnets 61, 62, the valve body 19 is actuated (i.e., opened/closed) under the condition in which the valve body 19 is affected only by the frictional resistance at each sliding portion. That is, according to the fifth embodiment, the electromagnetic force of the first and the second electromagnets 61, 62 during the displacement speed adjustment period is controlled so that the external force actually affecting the valve body is conformed to a target value, by determining the frictional resistance as the target value of the external force affecting the valve body 19. Although the sum of the FF current If and the FB current Ib is determined as the driving current I after calculating the FF current If and the FB current Ib individually in the first embodiment, in the fifth embodiment, the driving current I is directly calculated based on the deviation between the target value and the external force actually affecting the valve body 19.

Figure 11:
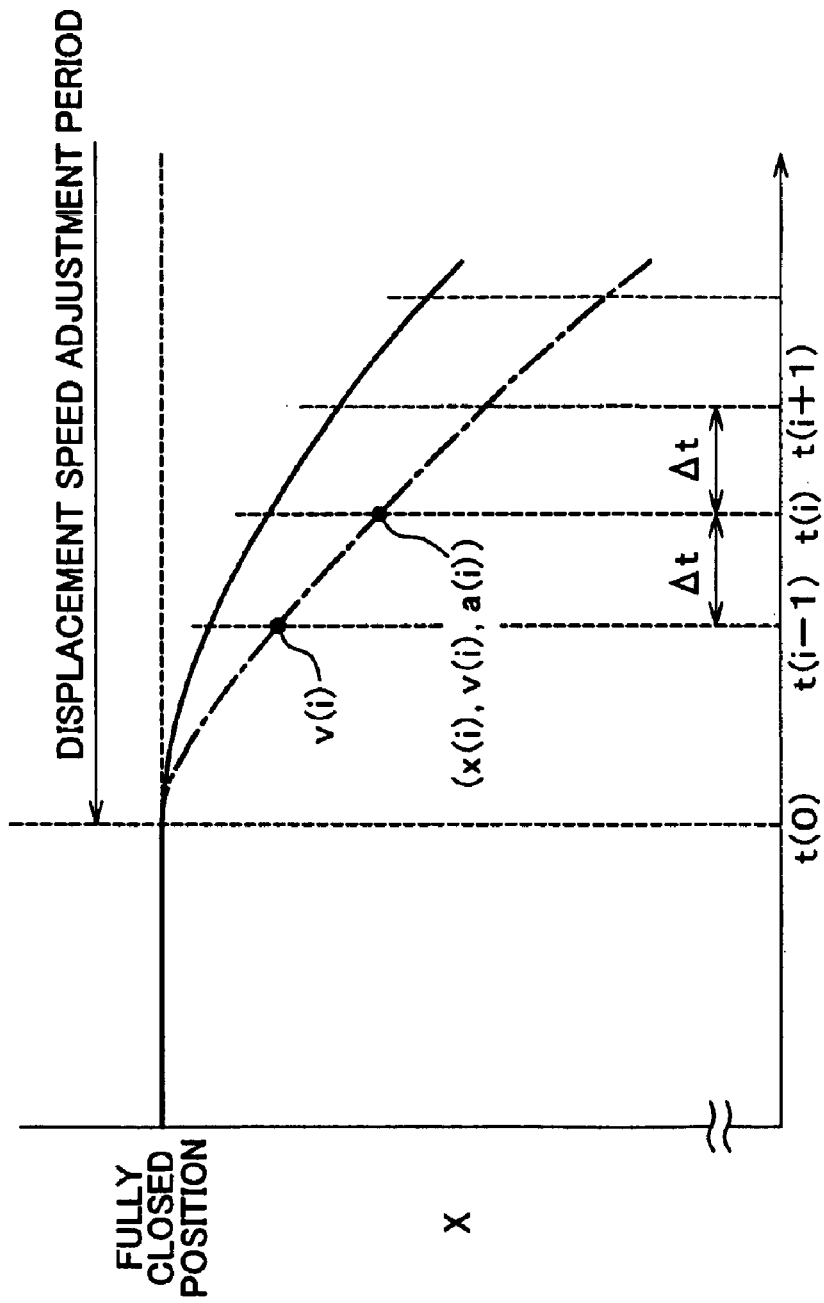
FIG. 11 is a timing chart for explaining a fifth embodiment and for showing a displacement amount of the valve body and an actual displacement amount versus time under a condition that the valve body is affected only by friction resistance when the displacement of the valve body at fully closed position in the direction for opening the valve starts from the opening actuation starting time.
Figure 12:
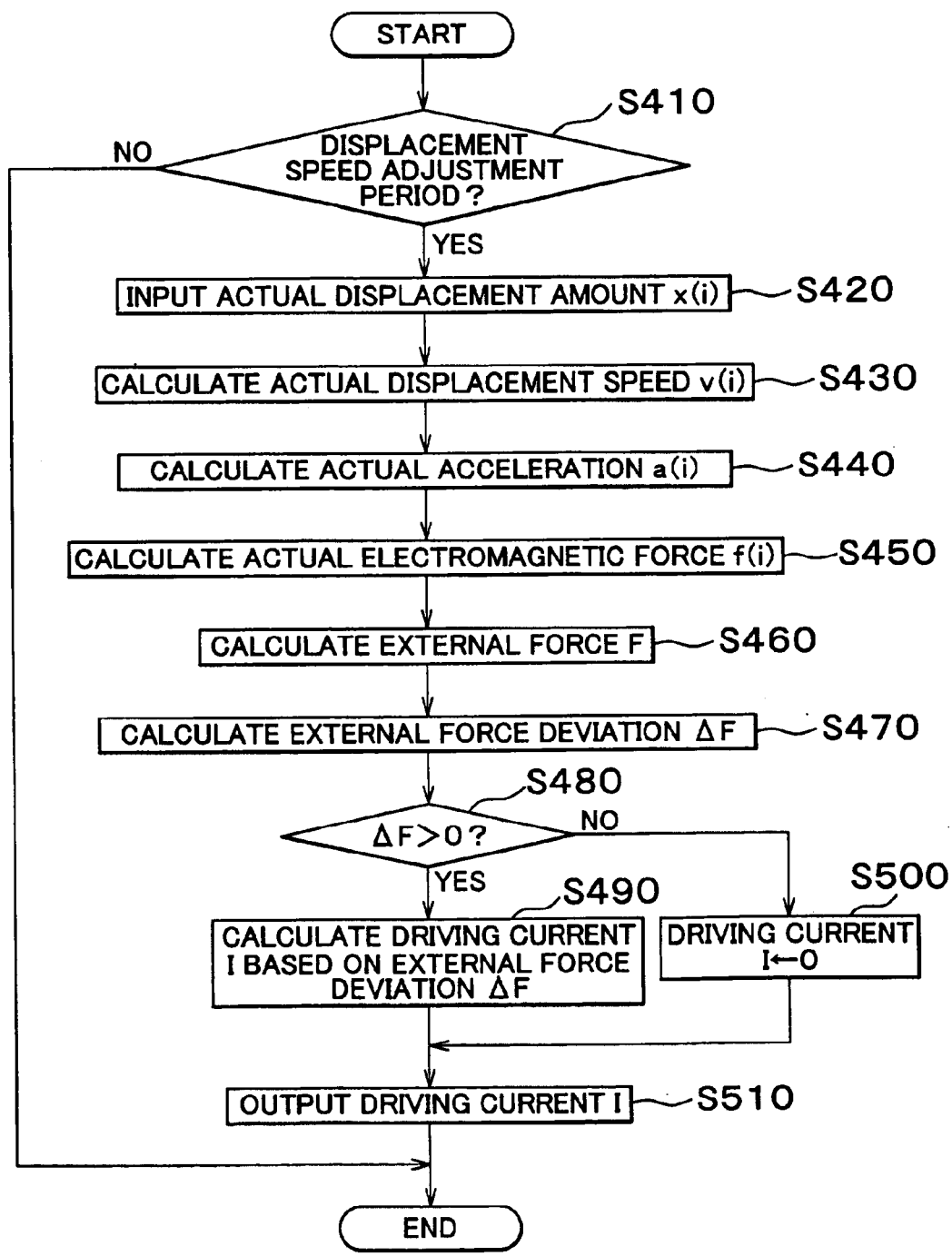
FIG. 12 is a flowchart showing an energization control procedure of the electromagnet according to the fifth embodiment.

The procedure of the energization control of the first and the second electromagnets 61, 62 according to the fifth embodiment will be explained referring to FIGS. 11–12 regarding the case for opening the valve body 19 of the exhaust valve 10 at the fully closed position. FIG. 11 is a timing chart showing the time shift of the displacement amount (i.e., shown with a solid line) and the actual displacement amount x (i.e., shown with a chained line) of the valve body 19 when affected only by the frictional resistance in the case that the displacement of the valve body 19 at the fully closed position in the direction for opening the valve starts from the opening actuation starting time (i.e., timing t(0)). FIG. 12 is a flowchart showing the procedure when controlling the energization of the first and the second electromagnets 61, 62. A series of steps shown in the flowchart is repeatedly carried out keeping a predetermined time interval Δt by the ECU 50.

According to the series of steps, first, it is determined whether the present control cycle t(i) is within the displacement speed adjustment period (i.e. Step 410). When it is determined that the present control cycle is not within the displacement speed adjustment period (i.e., Step 410: No), the series of steps is finished. During the holding period prior to the displacement speed adjustment period, the driving current I is determined to be a value (holding current) for maintaining the exhaust valve 10 at the fully closed condition through another transaction different from the series of the transactions.

On the other hand, when the present control cycle t(i) is within the displacement speed adjustment period (i.e., Step 410: Yes), the actual displacement amount x(i) is input (i.e., Step 420), and then the actual displacement speed v(i) at the present control cycle t(i) is calculated according to the formula (3) (i.e., Step 430).

According to the following formula (23), an actual acceleration a (i) of the valve body 19 at the present control cycle t(i) is calculated (i.e., Step 430).

$$a(i)=(v(i)-v(i-1))/\Delta t \tag{23}$$

According to the formula (23), v(i−1) corresponds to the actual displacement speed calculated at a previous control cycle t(i−1) (i.e., equal to t(i)−Δt) (referring to FIG. 11).

After calculating the actual acceleration a(i) and the actual displacement speed v(i) at the present control cycle t(i) in the foregoing manner, an actual electromagnetic force f(i) affecting the valve body 19 at the present control cycle t(i) is calculated according to the following formula (24) (i.e., Step 450).

$$f(i)=K_2 \cdot (I/G)^2+K_3 \tag{24}$$

$K_2$, $K_3$: constant

According to the formula (24), I corresponds to a driving current (i.e., command value) calculated at the previous control cycle t(i−1). G corresponds to the distance of the air gap at the present cycle t(i). When the strength of the driving current outputted relative to the first electromagnet 61 at the present control cycle t(i) can be observed by the ECU 50, the value of the actual driving current may be substituted for the foregoing formula (24) instead of the command value of the driving current.

By modeling the exhaust valve 10 as the spring/mass vibration system, the following equation of motion (25) can be obtained.

$$m \cdot a(i)+c \cdot v(i)+k \cdot x(i)=F+f(i) \tag{25}$$

According to the equation of motion (25), each model constant, m, c, k, is the same with the defined one in the foregoing formula (8). F corresponds to the external force F, that is, the resultant force of the force Fp affecting the valve body 19 based on the cylinder pressure and the frictional resistance Ff.

According to the following formula (26) obtained form the equation of motion (25), the external force F is calculated (i.e. Step 460).

$$F=m \cdot a(i)+c \cdot v(i)+k \cdot x(i)-f(i) \tag{26}$$

After calculating the external force F, a deviation ΔF between the external force F and the target value Ft (i.e., target external force) is calculated based on the following formula (27) (i.e., Step 470).

$$\Delta F = Ft - F \quad (27)$$

(Ft=Ff)

As described above, according to the fifth embodiment of the present invention, the target external force Ft is determined as the frictional resistance Ff at each sliding portion of the valve body 19. Accordingly, when no force Fp based on the cylinder pressure affects the valve body 19, the external force deviation ΔF is calculated as zero. On the other hand, when the force Fp based on the cylinder pressure affects the valve body 19 in the direction for displacing the valve body 19 in the direction for opening the valve (i.e., the direction for displacing the valve body 19 in the direction for closing the valve at closing actuation), the external deviation ΔF becomes greater than zero. Further, greater the strength of the Fp (|Fp|), the greater the external deviation ΔF. Accordingly, by generating the electromagnetic force having the same strength of the external force deviation ΔF in the first electromagnet 61 (i.e., to the second electromagnet 62 at closing actuation), the force Fp based on the cylinder pressure affecting the valve body 19 is cancelled by the electromagnetic force. Thus, the valve body 19 is displaced in the direction for opening the valve under the condition that only the frictional resistance Ff affects the valve body 19.

Then, it is determined whether the external force deviation ΔF is greater than zero (i.e., Step 480). When the external force deviation ΔF is equal to or less than zero (i.e., Step 480: No), the driving current I (i.e., command value) is determined to be zero since the force Fp based on the cylinder pressure does not affect the valve body 19 in the direction for opening the valve, and thus it is not required to decrease the displacement speed by attracting the valve body 19 in the direction for opening the valve (i.e., Step 500).

On the other hand, when the external deviation ΔF is greater than zero, the driving current I is calculated based on the following formula (28) in order to cancel the force Fp by the electromagnetic force of the first electromagnet 61 because the force Fp based on the cylinder pressure, etc. affects the valve body 19 in the direction for opening the valve (i.e., Step 490).

$$I = K_4 \cdot G \cdot \sqrt{\Delta F} + K_5 \quad (28)$$

$K_4$, $K_5$: constant

The driving current I is supplied for the first electromagnet 61 from the present control cycle t(i) to immediately before the next control cycle t(i+1) (i.e., Step 510). After controlling the electromagnetic force of the first electromagnet 61 in the foregoing manner, the series of steps is finished.

Although the case of opening the valve body 19 of the exhaust valve 10 from the fully closed position is explained as foregoing, the electromagnetic force of the second electromagnet 62 is controlled in the same manner when closing the valve body 19 from the fully open position. When closing the valve body of the intake valve 11 from the fully open position and when opening the valve body of the intake valve 11 from the fully closed position, the electromagnetic forces of the first and the second electromagnets 61, 62 are controlled in the same manner.

Although the equation of motion of the exhaust valve 10 can be applied when structuring an equation of motion of the intake valve 11, it is preferable to determine each model constant m, c, k, in accordance with specification of the intake valve 11 in order to perform the control with higher precision.

According to the fifth embodiment of the present invention in which the valve body 19 is controlled in the foregoing manner, in addition to the operational effects mentioned in (4) of the first embodiment, the following operational effects can be further achieved.

(13) According to the fifth embodiment of the control apparatus of electromagnetic valve of the present invention, the external force F affecting the valve body 19 is estimated using the model (i.e., the equation of motion) modeling the exhaust valve 10 or the intake valve 11 as the spring/mass vibration system, then the electromagnetic forces of the first and the second electromagnets 61, 62 are controlled based on the deviation ΔF between the estimated external force F and the target external force Ft (i.e., frictional resistance Ff). Accordingly, when the strength of the external force F affecting the valve body 19 deviates from the target external force Ft by the force Fp based on the cylinder pressure and the intake and exhaust pressure affecting the valve body 19 when actuating (i.e., opening and closing) the valve body 19, the electromagnetic forces of the first and the second electromagnets 61, 62 are controlled based on the external force deviation ΔF so that the external force F conforms to the target external force Ft. Thus, even when the force Fp based on the cylinder pressure and the intake and exhaust pressure varies in accordance with the engine operation, the electromagnetic force of the first and the second electromagnets 61, 62 can be corrected to be appropriate each time, and the decline of the operational stability due to the bouncing at open-close operation can be restricted. Moreover, since the electromagnetic forces of the first and the second electromagnets 61, 62 are controlled in accordance with the external force deviation as forgoing, and the electromagnetic force is corrected to be appropriate for the engine operation condition each time, it is no longer required to obtain the relationship between the engine operation condition and the corresponding appropriate electromagnetic force. Thus, the determination of the control constants can be simplified.

(14) According to the fifth embodiment, the external force F is calculated from the model (i.e., equation of motion) modeling the exhaust valve 10 and the intake valve 11 as the spring/mass vibration system, and the driving current I is calculated based on the deviation ΔF between the external force F and the target external force Ft. Thus, the strength of the driving current I can be determined while confirming the dynamic behavior of the valve body 19 and thus the displacement speed can be decreased by providing the appropriate electromagnetic force based on the driving current I to the valve body 19. As a result, the convergence of the external force F relative to the target external force Ft can be improved.

(15) Since the external force F affecting the valve body 19 is estimated based on the spring/mass vibration system model for simulating the opening and closing behavior of the valve body 19, it is not required to additionally provide the sensors for estimating the external force F such as the cylinder pressure sensor and the exhaust pressure sensor. Thus, the structure of the control apparatus of the electromagnetic valve can be simplified.

(16) Since the electromagnetic forces of the first and the second electromagnets 61, 62 are controlled based on the deviation ΔF between the external force F affecting the valve body 19 and the target external force Ft, complicated derivations, such as obtaining the relationship between the engine operation condition and the corresponding appropriate electromagnetic force thereof regarding the exhaust valve 10 and the intake valve 11, are no longer required. Thus, the electromagnetic forces of the first and the second electromagnets 61, 62 can be appropriately controlled using the same control logic both when opening and closing the intake valve 11 and when opening and closing the exhaust valve 10.

(17) Since the target external force Ft relative to the external force F affecting the valve body 19 is predetermined as the frictional resistance Ff at each sliding portion of the valve body 19, the valve body 19 can be displaced from one displacement end to the other displacement end while minimizing the strength of the electromagnetic forces provided from the first and the second electromagnets 61, 62 to the valve body 19 during displacement speed adjustment periods. Thus, power consumption when actuating the valve body 19 can be reduced.

(18) Since the driving current I is variably determined based on the distance of the air gap G even if the external force deviation ΔF is the same when calculating the driving current I from the external force deviation ΔF, the driving current I can be calculated as the value corresponding to the distance of the air gap G, and the appropriate strength of the electromagnetic force can be provided relative to the valve body 19. As a result, the convergence of the external force F relative to the target external force Ft can be improved.

Sixth Embodiment:

A sixth embodiment of the control apparatus of electromagnetic valve according to the present invention, particularly, regarding the differences from the fifth embodiment will be explained as follows.

As described above, during the holding period preceding the displacement speed adjustment period, in order to maintain the valve body 19 at the fully closed position or at the fully open position, the holding current is supplied to the first electromagnet 61 or to the second electromagnet 62. The valve body 19 (the armature 28) is attracted to be in contact with the upper core 32 of the first electromagnet 61 or the lower core 34 of the second electromagnets 62 by the predetermined electromagnetic force. When the holding period ends and the displacement speed adjustment period begins, the supply of the holding current is suspended, eliminating the electromagnetic forces of the first and the second electromagnets 61, 62 which have been attracting the valve body 19.

However, in practice, even after the supply of the holding current is suspended, the residual electromagnetic force is generated in the armature 28 and the upper and the lower cores 32, 34. Further, when controlling the driving circuit of the first and the second electromagnets 61, 62 for suspending the supply of the holding current, a predetermined response delay exists until actually the holding current becomes zero. Accordingly, as shown in FIG. 13, when the valve body 19 is actuated after the transition from the holding period to the displacement speed adjustment period, from the start of the opening or closing actuation until the predetermined time elapses (i.e., timing t0–t1), the electromagnetic forces generated in the first and the second electromagnets 61, 62 due to the residual electromagnetic force and the response delay of the holding current (i.e., hereinafter they are referred to as the residual electromagnetic force Fr after holding) affect the valve body 19. Thus, the valve body 19 is attracted in the direction for closing the valve (i.e., at opening actuation) or in the direction for opening the valve (i.e., at closing actuation) by the residual electromagnetic force Fr after holding.

Accordingly, when the driving current I is determined without considering the influence of the residual electromagnetic force Fr after holding, the excessively strong electromagnetic force affects the valve body 19 immediately after the transition from the holding period to the displacement speed adjustment period, because each of the electromagnetic forces of the first and the second electromagnets 61, 62 for attracting the valve body 19 in the direction for closing the valve (ie. at opening actuation) or in the direction for opening the valve (i.e., closing actuation) becomes stronger by the amount corresponding to the residual electromagnetic force Fr after holding.

When the actual electromagnetic force f(i) is calculated based on the actual driving current (i.e. Step 450 of FIG. 12) by observing the strength of the driving current actually supplied to the first and the second electromagnets 61, 62 as shown in the fifth embodiment, the driving current I (i.e., command value) can be calculated considering the electromagnetic force generated in the first and the second electromagnets 61, 62 even after the transition to the displacement speed adjustment period due to the response delay of the holding current. However, in this case, it is required to provide additional mechanisms for observing the actual driving current in the ECU 50, which add complexity to the structure. Moreover, even in this case, the residual electromagnetic force Fr after holding generated in the armature 28 and the upper and the lower cores 32, 34 cannot be taken into the consideration.

In light of the foregoing, in the sixth embodiment of the control apparatus of electromagnetic valve according to the present invention, the force affecting the valve body 19 when actuating (i.e., opening and closing) the valve body under the condition that the valve body 19 is not affected by the force Fp based on the cylinder pressure and the intake and exhaust pressure, that is, a resultant force of the residual electromagnetic force Fr after holding and the frictional resistance Ff obtained in advance through the experiments, is determined as the target external force Ft as shown in the following formula (29).

$$Ft=Fr+Ff \qquad (29)$$

Through the series of steps shown in FIG. 12, the deviation ΔF between the target external force Ft and the external force F actually affecting the valve body 19 is calculated. Then, the energizations of the first and the second electromagnets 61, 62 are controlled based on the driving current I calculated from the deviation ΔF.

According to the sixth embodiment of the present invention in which the electromagnetic force when actuating the valve body 19 is controlled in the foregoing manner, in addition to the operational effects mentioned in the fifth embodiment, the following operational effects can be further achieved.

(19) Since the target external force Ft is predetermined to be the resultant force of the residual electromagnetic force Fr after holding and the frictional resistance Ff and the electromagnetic forces of the first and the second electromagnets 61,62 are controlled based on the deviation ΔF therebetween so that the actual external force F conforms to the target external force Ft, the appropriate electromagnetic force which corresponds to the residual electromagnetic force Fr after holding can be generated in the first and the second electromagnets 61, 62 without adding complexity to the structure, such as providing the mechanism for observing the actual driving current. Thus, the decline of the operational stability due to the bouncing at open-close operation can be further suitably controlled.

Although the present invention has been explained referring to the above-described embodiments, the structure of the embodiment of the present invention can be changed as follows.

Although, in the foregoing embodiments, the holding current is supplied to the first and the second electromagnets 61, 62 during the holding period for maintaining the valve body 19 at the fully closed position or at the fully open position by the electromagnetic force generated by the supply of the holding current, the valve body 19 may be maintained at the fully closed position or at the fully open position by the electromagnetic force of a permanent magnet by providing the permanent magnets to the upper and lower cores 32, 34 of the first and the second electromagnets 61, 62. In this case, by generating the magnetic flux in the first and the second electromagnets 61, 62 in opposite direction to the magnetic flux generated by the permanent magnet, the magnetic flux of the permanent magnet is canceled.

Although, according to the first through fourth embodiments, the target displacement amount xt is determined relative to the actual displacement amount x and the target displacement speed vt is calculated from the target displacement amount xt when necessary, the target displacement speed vt relative to the actual displacement amount x of the valve body 19 may be predetermined to be memorized in the ECU 50 in advance.

Although, according to the first embodiment, only a proportional (P) term of PID control (i.e., equal to Kp·Δx) is calculated when calculating the FB current Ib, a integral (I) term (i.e., equal to ∫Ki·Δx·dt) and a differential (D) term (i.e., equal to Kd·d (Δx)/dt) may be additionally calculated. Likewise, when calculating the driving current I from the electromagnetic force requires value Fem calculated based on the energy amount deviation ΔE, in addition to the proportional term, an integral term and a differential term may be additionally calculated. When structured in this manner, the convergence of the external force F affecting the valve body 19 and of the state quantity (i.e., displacement amount and displacement speed) varied in accordance with the external force F relative to the target value can be improved.

Although, according to the first embodiment, the deviation Δx is calculated as the parameter showing the deviation between the actual displacement amount x and the target displacement amount xt, for example, the deviation can be evaluated by a ratio of the actual displacement amount x to the target displacement amount xt (i.e., x/xt). Likewise, in the fifth and the sixth embodiments, the deviation between the external force F actually affecting the valve body 19 and the target external force Ft can be evaluated by the ratio therebetween (i.e., F/Ft)

According to the second embodiment, the force affecting in accordance with the engine load relative to the exhaust valve 10 is estimated based on the differential pressure between the cylinder pressure and the exhaust pressure. Focusing attention that the fluctuation of the exhaust pressure is relatively smaller in general compared to the fluctuation of the cylinder pressure which is largely varied in accordance with the engine operation, the force affecting the exhaust valve 10 may be estimated only based on the cylinder pressure by assuming the exhaust pressure being constant. Or, the exhaust pressure may be estimated based on the cylinder pressure since the cylinder pressure and the exhaust pressure are correlated with each other. In this manner, the exhaust pressure sensor 58 can be excluded and the structure of the controller is simplified.

Although the intake pressure used for estimating the external force is directly detected by the intake pressure sensor in the second embodiment, the intake pressure may be estimated based on the intake air amount and the engine revolution speed detected by, for example, an air flow meter.

Although the acceleration required value "a" of the valve body 19 is calculated based on the actual displacement speed v(i) at the present control cycle t(i) and the target displacement speed vt(i+1) at the next control cycle t(i+1) in the second embodiment, the acceleration required value "a" may be calculated based on the actual displacement speed v(i) at the present control cycle t(i) and the target displacement speed vt(i).

Although the electromagnetic force required value Fem is calculated based on the energy amount deviation ΔE between the actual mechanical energy amount E of the valve body 19 at the present control cycle t(i) and the target mechanical energy amount Et in the fourth embodiment, the electromagnetic force required value Fem may be calculated based on the energy amount deviation ΔE between the actual mechanical energy amount E at the present control cycle t(i) and the target mechanical energy amount Et at the next control cycle t(i+1).

Although the electromagnetic force required value Fem is calculated based on the formula (22) in the fourth embodiment, the sum of the external force affecting the valve body 19 at the present control cycle t(i) and the value for canceling the estimated external force, that is, the force in the opposite direction obtained from the formula (23) may be set as the electromagnetic force required value Fem. In this structure, since the energy amount deviation ΔE generated by the external force is canceled in the feed forward manner, the convergence of the actual displacement amount x and the actual displacement speed "v" relative to the target displacement amount xt and the target displacement speed vt can be further increased. As mentioned in the second embodiment, the external force may be estimated based on the detection signal of the pressure sensors 54, 56, 58 or may be estimated using the observer as mentioned in the third embodiment.

Although the frictional resistance Ff generated at sliding portion of the valve body 19 or the resultant force of the frictional resistance Ff and the residual electromagnetic force Fr after holding are determined as the target external force Ft according to the fifth and the sixth embodiments, the target external force Ft may be determined as zero or as only the residual electromagnetic force Fr after holding.

Although the driving current I of the first and the second electromagnets 61, 62 is directly calculated based on the external force deviation ΔF according to the fifth and the sixth embodiments, the driving current I may be calculated as the sum of the FB current Ib calculated as the product of the external force deviation ΔF and the feedback gain in accordance with the air gap G and the FF current If determined to be a constant value in the opposite direction to the holding current after the transition from the holding period to the displacement speed adjustment period until a predetermined time has elapsed. Further, in this case, the FB current Ib can be calculated as the sum of the integral term and the differential term in addition to the proportional term.

Although the external force F is estimated based on the formula (26) obtained from the equation of motion (25) regarding the spring/mass vibration system model for simulating the opening and closing behavior of the valve body 19 in the fifth and the sixth embodiments, the external force F can be estimated by using the observer for observing the internal condition of the valve body based on the spring/mass vibration system model as mentioned in the third embodiment.

While the invention has been described with reference to preferred embodiments thereof, it is to be understood that the invention is not limited to the preferred embodiments. To the contrary, the invention is intended to cover various modifications and equivalent arrangements. In addition, while the various elements of the preferred embodiments are shown in various combinations and configurations, these are exemplary. Other combinations and configurations, including more, less or only a single element, are also within the spirit and scope of the invention.

What is claimed is:

1. A control apparatus of an electromagnetic valve having a valve body functioning as an intake valve or an exhaust valve of an internal combustion engine and an electromagnet affecting an electromagnetic force to an armature provided on the valve body for displacing the valve body between a first position and a second position, the control apparatus comprising:

a controller which determines a force affecting the valve body when displacing the valve body from the first position to the second position and a state quantity of the valve body varying in accordance with the force affecting the valve body, determines a target value of the force affecting the valve body or determines a target value of the state quantity of the valve body varying in accordance with the force affecting the valve body, and controls the electromagnetic force of the electromagnet for attracting the armature toward the first position based on a deviation between the determined force and the target value of the force, or controls the electromagnetic force of the electromagnet for attracting the armature toward the first position based on a deviation between the determined state quantity and the target value of the state quantity, so that the deviation is minimized, when the valve body is displaced form the first position to the second position, wherein the valve body is opened and closed by an elastic force of a spring in addition to the electromagnetic force and the controller determines the state quantity of the valve body varying in accordance with a sum of the forces affecting the valve body when displacing the valve body from the first position to the second position based on the elastic force of the spring as the target value, the controller performs a feedback-control of the electromagnetic force based on the deviation, and the controller determines a feedback gain when performing the feedback-control of the electromagnetic force based on a distance of an air gap between the armature and the electromagnet, wherein the target value of the state quantity of the valve body is a state quantity at a time when the valve body is freely vibrated based on an elastic force of the spring affecting the valve body.

2. A control apparatus of an electromagnetic valve according to claim 1, wherein the controller calculates a required value of the electromagnetic force necessary for minimizing the deviation based on a physical motion model of the electromagnetic valve having at least one of the determined force and the state quantity as a model variable, and controls the electromagnetic force based on the electromagnetic force required value.

3. A control apparatus of an electromagnetic valve according to claim 1, wherein the state quantity is a displacement amount of the valve body, and the controller controls the electromagnetic force based on the deviation between the detected displacement amount and the target value of the displacement amount.

4. A control apparatus of an electromagnetic valve according to claim 1, wherein the state quantity is a displacement speed of the valve body, and the controller controls the electromagnetic force based on the deviation between the displacement speed and the target value of the displacement speed.

5. A control apparatus of an electromagnetic valve according to claim 1, wherein the state quantity is a mechanical energy amount of the valve body, and the controller controls the electromagnetic force based on the deviation between the detected mechanical energy amount and the target value of the mechanical energy amount.

6. A control apparatus of an electromagnetic valve according to claim 1, wherein the controller determines the force affecting the valve body by estimating the force affecting the valve body, and controls the electromagnetic force based on the deviation between the estimated force affecting the valve body and the target value of the force affecting the valve body.

7. A control apparatus of an electromagnetic valve according to claim 1, wherein the controller performs a feedback-control of the electromagnetic force based on the deviation.

8. A control apparatus of an electromagnetic valve according to claim 7, wherein the controller determines a feedback gain when performing the feedback-control of the electromagnetic force based on a distance of an air gap between the armature and the electromagnet.

9. A control apparatus of an electromagnetic valve according to claim 1, wherein the controller calculates a required value of the electromagnetic force necessary for minimizing the deviation based on a physical motion model of the electromagnetic valve having at least one of the determined force and the state quantity as a model variable, and controls the electromagnetic force based on the electromagnetic force required value.

10. A control apparatus of an electromagnetic valve according to claim 1, wherein the state quantity is a displacement amount of the valve body, and the controller controls the electromagnetic force based on the deviation between the detected displacement amount and the target value of the displacement amount.

11. A control apparatus of an electromagnetic valve according to claim 1, wherein the state quantity is a displacement speed of the valve body and the controller controls the electromagnetic force based on the deviation between the detected displacement speed and the target value of the displacement speed.

12. A control apparatus of an electromagnetic valve according to claim 1, wherein the state quantity is a mechanical energy amount of the valve body, and the controller controls the electromagnetic force based on the deviation between the detected mechanical energy amount and the target value of the mechanical energy amount.

13. A control apparatus of an electromagnetic valve according to claim 1, wherein the controller determines the force affecting the valve body by estimating the force affecting the valve body, and controls the electromagnetic force based on the deviation between the estimated force and the target value of the force affecting the valve body.

14. A method for controlling a control apparatus of an electromagnetic valve having a valve body functioning as an intake valve or an exhaust valve of an internal combustion engine and an electromagnet affecting an electromagnetic force to an armature provided on the valve body for displacing the valve body between a first position and a second position, the method comprising the steps of:

determining a force affecting the valve body when displacing the valve body from the first position to the second position and a state quantity of the valve body varying in accordance with the force affecting the valve body;

determining a target value of the force affecting the valve body when displacing the valve body from the first position to the second position or determining a target value of the state quantity of the valve body varying in accordance with the force affecting the valve body, controlling the electromagnetic force of the electromagnet for attracting the armature toward the first position based on a deviation between the determined force and the target value of the force, or controlling the electromagnetic force of the electromagnet for attracting the armature toward the first position based on a deviation between the determined state quantity and the target value of the state quantity, so that the deviation is minimized, when displacing the valve body from the first position to the second position, opening and closing the valve body by an elastic force of a spring in addition to the electromagnetic force;

determining the state quantity of the valve body varying in accordance with a sum of the forces affecting the valve body when displacing the valve body from the first position to the second position based on the elastic force of the spring as the target value;

performing a feedback-control of the electromagnetic force based on the deviation; and determining a feedback gain when performing the feedback-control of the electromagnetic force based on a distance of an air gap between the armature and the electromagnet, wherein the target value of the state quantity of the valve body is a state quantity at a time when the valve body is freely vibrated based on an elastic force of the spring affecting the valve body.

15. A method for controlling the control apparatus of an electromagnetic valve according to claim 14, wherein a required value of the electromagnetic force necessary for minimizing the deviation is calculated based on a physical motion model of the electromagnetic valve having at least one of the force and the state quantity as a model variable and the electromagnetic force is controlled based on the electromagnetic force required value.

16. A method for controlling the control apparatus of an electromagnetic valve according to claim 14, wherein the state quantity is a displacement amount of the valve body, and the controlling step further comprises controlling the electromagnetic force based on a deviation between the detected displacement amount and the target value of the displacement amount.

17. A method for controlling the control apparatus of an electromagnetic valve according to claim 14, wherein the state quantity is a displacement speed of the valve body, and the controlling step further comprises controlling the electromagnetic force based on a deviation between the detected displacement speed and the target value of the displacement speed.

18. A method for controlling the control apparatus of an electromagnetic valve according to claim 14, wherein the state quantity is a mechanical energy amount of the valve body, and the controlling step further comprises controlling the electromagnetic force based on a deviation between the detected mechanical energy amount and the target value of the mechanical energy amount.

19. A method for controlling a control apparatus of an electromagnetic valve having a valve body functioning as an intake valve or an exhaust valve of an internal combustion engine and an electromagnet affecting an electromagnetic force to an armature provided on the valve body for displacing the valve body between a first position and a second position, the method comprising the steps of:

determining a target value of the force affecting the valve body when displacing the valve body from the first position to the second position;

estimating a force affecting the valve body; and controlling the electromagnetic force during a period from the start of the displacement of the valve body from the first position to the second position until the valve body reaches a neutral position based on a deviation between the estimated force affecting the valve body and the target value of the force affecting the valve body, by performing a feedback-control of the electromagnetic force based on the deviation, and determining a feedback gain when performing the feedback-control of the electromagnetic force based on a distance of an air gap between the armature and the electromagnet, wherein the force affecting the valve body is obtained by using a dynamic equation which has a displacement amount when the valve body vibrates freely based on an elastic force of a spring affecting the valve body.

* * * * *